(12) United States Patent
Ma

(10) Patent No.: US 12,452,805 B2
(45) Date of Patent: Oct. 21, 2025

(54) AUTOMATIC ALIGNMENT OF PRESENTATION TIME OFFSETS IN DIFFERENT COMMUNICATION DIRECTIONS

(71) Applicant: Nokia Solutions and Networks Oy, Espoo (FI)

(72) Inventor: Xiaohua Ma, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/355,490

(22) Filed: Jun. 23, 2021

(65) Prior Publication Data
US 2022/0039034 A1 Feb. 3, 2022

(30) Foreign Application Priority Data

Jul. 30, 2020 (CN) .......................... 202010749807.0

(51) Int. Cl.
*H04W 56/00* (2009.01)
*H04L 45/12* (2022.01)
*H04W 40/02* (2009.01)

(52) U.S. Cl.
CPC ......... *H04W 56/001* (2013.01); *H04L 45/123* (2013.01); *H04W 40/02* (2013.01)

(58) Field of Classification Search
CPC .... H04L 45/123; H04W 40/02; H04W 56/001
See application file for complete search history.

(56) References Cited

U.S. PATENT DOCUMENTS 5,003,543 A * 3/1991 Morsell ................. B82Y 10/00
372/5
5,089,711 A * 2/1992 Morsell ................ H01S 3/0057
250/493.1
(Continued)

FOREIGN PATENT DOCUMENTS

CN 101459502 A 6/2009
CN 102474838 A 5/2012
(Continued)

OTHER PUBLICATIONS

"IEEE Standard for Radio over Ethernet Encapsulations and Mappings; IEEE Std1914.3-2018", IEEE Standard, IEEE, Piscataway, NJ USA, Oct. 5, 2018 (Oct. 5, 2018), pp. 1-77, XP068132831, DOI: 10.1109/IEEESTD.2018.8486937 ISBN: 978-1-5044-5038-6 [retrieved on Oct. 9, 2018].

(Continued)

*Primary Examiner* — Wutchung Chu
*Assistant Examiner* — Berhanu D Belete
(74) *Attorney, Agent, or Firm* — Harness, Dickey & Pierce, P.L.C.

(57) ABSTRACT

In the method, the first device may transmit to a second device a first initial duration of the first presentation time offset, where the first presentation time offset is a period from data being input to the first device to the data being output from the second device. Besides, the first device may receive, from the second device, the second initial duration of a second presentation time offset, where the second presentation time offset is a period from data being input to the second device to the data being output from the first device. Afterwards, the first device may determine an adjusted duration of the first presentation time offset based on a longer one of the first initial duration and the second initial duration.

24 Claims, 9 Drawing Sheets

(56) References Cited

U.S. PATENT DOCUMENTS

| | | | | |
|---|---|---|---|---|
| 8,577,727 | B1* | 11/2013 | Harrity | G06Q 30/00 |
| | | | | 705/16 |
| 9,608,752 | B2* | 3/2017 | Ruffini | H04W 56/005 |
| 10,412,697 | B2* | 9/2019 | Chen | H04W 88/085 |
| 10,530,828 | B2* | 1/2020 | Lim | H04L 47/32 |
| 10,594,423 | B1* | 3/2020 | Anand | H04J 3/0664 |
| 11,095,384 | B2* | 8/2021 | Anand | H04L 47/28 |
| 2005/0069063 | A1* | 3/2005 | Waltho | H04B 1/525 |
| | | | | 375/346 |
| 2006/0092850 | A1 | 5/2006 | Neidhardt et al. | |
| 2006/0221908 | A1* | 10/2006 | Hoshina | H04W 88/08 |
| | | | | 370/335 |
| 2008/0049795 | A1* | 2/2008 | Lakaniemi | H04L 43/087 |
| | | | | 370/352 |
| 2009/0092371 | A1* | 4/2009 | Miyaki | H04H 20/106 |
| | | | | 386/E5.028 |
| 2009/0232113 | A1* | 9/2009 | Tamaki | H04W 56/003 |
| | | | | 370/347 |
| 2010/0141323 | A1* | 6/2010 | Kim | H03K 5/133 |
| | | | | 327/261 |
| 2011/0158264 | A1* | 6/2011 | Philips | H04J 3/062 |
| | | | | 370/516 |
| 2011/0176483 | A1* | 7/2011 | Palanki | H04W 56/0015 |
| | | | | 370/328 |
| 2011/0276648 | A1* | 11/2011 | Soldan | H04N 21/4305 |
| | | | | 709/208 |
| 2012/0236842 | A1* | 9/2012 | De Foy | H04W 4/08 |
| | | | | 370/350 |
| 2013/0246643 | A1* | 9/2013 | Luby | H04L 65/762 |
| | | | | 709/231 |
| 2014/0064034 | A1* | 3/2014 | Zhang | G01S 11/14 |
| | | | | 367/127 |
| 2015/0229465 | A1* | 8/2015 | De Foy | H04L 67/10 |
| | | | | 709/205 |
| 2015/0268925 | A1* | 9/2015 | Goldhor | G06F 16/41 |
| | | | | 700/94 |
| 2015/0280874 | A1* | 10/2015 | Lim | H04L 65/70 |
| | | | | 370/329 |
| 2015/0286203 | A1* | 10/2015 | Stattelmann | G05B 11/01 |
| | | | | 700/109 |
| 2016/0005298 | A1* | 1/2016 | Takahashi | G08B 21/187 |
| | | | | 340/679 |
| 2016/0173359 | A1* | 6/2016 | Brenner | A61B 5/02438 |
| | | | | 709/224 |
| 2017/0223633 | A1* | 8/2017 | Brisebois | H04W 76/27 |
| 2017/0353237 | A1* | 12/2017 | Johansson | H04L 7/0075 |
| 2018/0049147 | A1* | 2/2018 | Chen | H04W 56/0015 |
| 2018/0069801 | A1* | 3/2018 | Qi | H04L 43/0852 |
| 2018/0191873 | A1* | 7/2018 | Bao | H04L 69/324 |
| 2019/0364527 | A1* | 11/2019 | Kwon | H04B 7/15 |
| 2019/0373041 | A1* | 12/2019 | Lee | H04L 47/25 |
| 2020/0021378 | A1* | 1/2020 | Aweya | H04J 3/0673 |
| 2020/0100200 | A1* | 3/2020 | Lin | H04W 56/004 |
| 2020/0133572 | A1* | 4/2020 | Park | G06F 3/0679 |
| 2020/0204469 | A1 | 6/2020 | Filsfils et al. | |
| 2020/0275492 | A1* | 8/2020 | Lei | H04W 56/0045 |
| 2020/0336926 | A1* | 10/2020 | Cui | H04L 43/0858 |
| 2021/0075532 | A1* | 3/2021 | Anand | H04J 3/0661 |
| 2021/0410092 | A1* | 12/2021 | Xu | H04W 56/005 |
| 2022/0272644 | A1* | 8/2022 | Lee | H04S 3/00 |

FOREIGN PATENT DOCUMENTS

| | | | | |
|---|---|---|---|---|
| CN | 103840952 | A | | 6/2014 |
| CN | 103999541 | A | | 8/2014 |
| CN | 104782064 | A | | 7/2015 |
| CN | 106211306 | A | | 12/2016 |
| CN | 111327657 | A | | 6/2020 |
| CN | 114731285 | A | * | 7/2022 |
| EP | 3214879 | A1 | * | 9/2017 ............... H04J 3/06 |
| EP | 3280198 | A1 | | 2/2018 |
| WO | WO-2009019168 | A1 | * | 2/2009 ........... H04L 12/437 |
| WO | WO-2014/037061 | A1 | | 3/2014 |

OTHER PUBLICATIONS

Search Report for European Application No. 21186558.9 dated Jan. 27, 2022.
European Office Action dated Jun. 7, 2023 issued in corresponding European Appln. No. 21186558.9.
Chinese Office Action dated Jan. 19, 2024 for corresponding Chinese Patent Application No. 202010749807.0.
Second Chinese Office Action dated Jun. 27, 2024 for corresponding Chinese Patent Application No. 202010749807.0 and its English-language translation.
European Office Action dated Jun. 28, 2024 for corresponding European Patent Application No. 21186558.9.
Third Chinese Office Action dated Oct. 31, 2024 for corresponding Chinese Patent Application No. 202010749807.0 and its English-language translation.
Fourth Chinese Office Action dated Jan. 15, 2025 for corresponding Chinese Patent Application No. 202010749807.0 and its English-language translation.
Chinese office action dated Mar. 21, 2025, issued in corresponding Chinese Patent Application No. 202010749807.0.
European Office Action dated Sep. 9, 2025 for corresponding European Patent Application No. 21186558.9, dated Sep. 9, 2025.

\* cited by examiner

AUTOMATIC ALIGNMENT OF PRESENTATION TIME OFFSETS IN DIFFERENT COMMUNICATION DIRECTIONS

CROSS-REFERENCE TO RELATED APPLICATIONS

The present application claims priority under 35 U.S.C. § 119 to Chinese Patent Application No. 202010749807.0, filed on Jul. 30, 2020, in the Chinese Patent Office, the entire contents of which are hereby incorporated by reference.

FIELD

Embodiments of the present disclosure generally relate to the field of communication techniques, and more specifically, to a solution of aligning presentation time offsets in different communication directions between the communication devices.

BACKGROUND

Radio over Ethernet (RoE) encapsulation and mapping standard is also known as Institute of Electrical and Electronic Engineers (IEEE) 1914.3-2018 or P1914.3a standard. It defines encapsulations and mappings of radio protocols transmitted via Ethernet frames or Internet Protocol (IP) packets and operations of mapper and de-mapper. In the Standard, structure-agnostic definitions are provided for any digitized radio data, structure-aware definitions are provided for Common Public Radio Interface (CPRI) and native mode definitions are provided for normal and compressed digitized radio in-phase and quadrature (I/Q) payload. Additionally, the Standard provides the criteria for parameters, control messages and mechanisms provided for operation, administration and maintenance of mapping and demapping functionality.

When a solution regarding the transport of the CPRI protocol data over the Ethernet is designed on the basis of the IEEE 1914.3 or P1914.3a Standard, the total end-to-end delay of CPRI connection may be controlled by "presentation time offset". In the conventional solution, the presentation time offset is manually set by an operator of the communication system, which is complicated and tedious to the operator.

SUMMARY

Embodiments of the present disclosure propose a technical solution of aligning the presentation time offsets in different communication directions between the communication devices, and specifically provide a method, a device, an apparatus and computer-readable medium for communication.

According to a first aspect of the present disclosure, there is provided a method for communication. The method comprises: transmitting, at a first device, to a second device a first initial duration of a first presentation time offset, the first presentation time offset being a period from data being input to the first device to the data being output from the second device. The method also comprises: receiving, from the second device, a second initial duration of a second presentation time offset, the second presentation time offset being a period from data being input to the second device to the data being output from the first device. The method further comprises: determining an adjusted duration of the first presentation time offset based on a longer one of the first initial duration and the second initial duration.

According to a second aspect of the present disclosure, there is provided a first device. The first device comprises at least one processor and at least one memory storing computer program instructions. The at least one memory and the computer program instructions are configured, with the at least one processor, to cause the first device to transmit, to a second device, a first initial duration of a first presentation time offset, the first presentation time offset being a period from data being input to the first device to the data being output from the second device. The at least one memory and the computer program instructions are further configured, with the at least one processor, to cause the first device to receive, from the second device, a second initial duration of a second presentation time offset, the second presentation time offset being a period from data being input to the second device to the data being output from the first device. The at least one memory and the computer program instructions are further configured, with the at least one processor, to cause the first device to determine an adjusted duration of the first presentation time offset based on a longer one of the first initial duration and the second initial duration.

According to a third aspect of the present disclosure, there is provided an apparatus for communication. The apparatus comprises: means for transmitting, at a first device to a second device, a first initial duration of a first presentation time offset, the first presentation time offset being a period from data being input to the first device to the data being output from the second device. The apparatus also comprises: means for receiving, from the second device, a second initial duration of a second presentation time offset, the second presentation time offset being a period from data being input to the second device to the data being output from the first device. The apparatus further comprises: means for determining an adjusted duration of the first presentation time offset based on a longer one of the first initial duration and the second initial duration.

According to a fourth aspect of the present disclosure, there is provided a computer-readable medium storing machine-executable instructions which, when executed, cause a machine to perform the method of the first aspect.

It should be appreciated that the contents described in this Summary are not intended to identify key or essential features of the embodiments of the present disclosure, or limit the scope of the present disclosure. Other features of the present disclosure will be understood more easily through the following description.

BRIEF DESCRIPTION OF THE DRAWINGS

Through the following detailed description with reference to the accompanying drawings, the above and other objectives, features, and advantages of embodiments of the present disclosure will become more apparent. Several example embodiments of the present disclosure will be illustrated by way of example but not limitation in the drawings.

Figure 1:
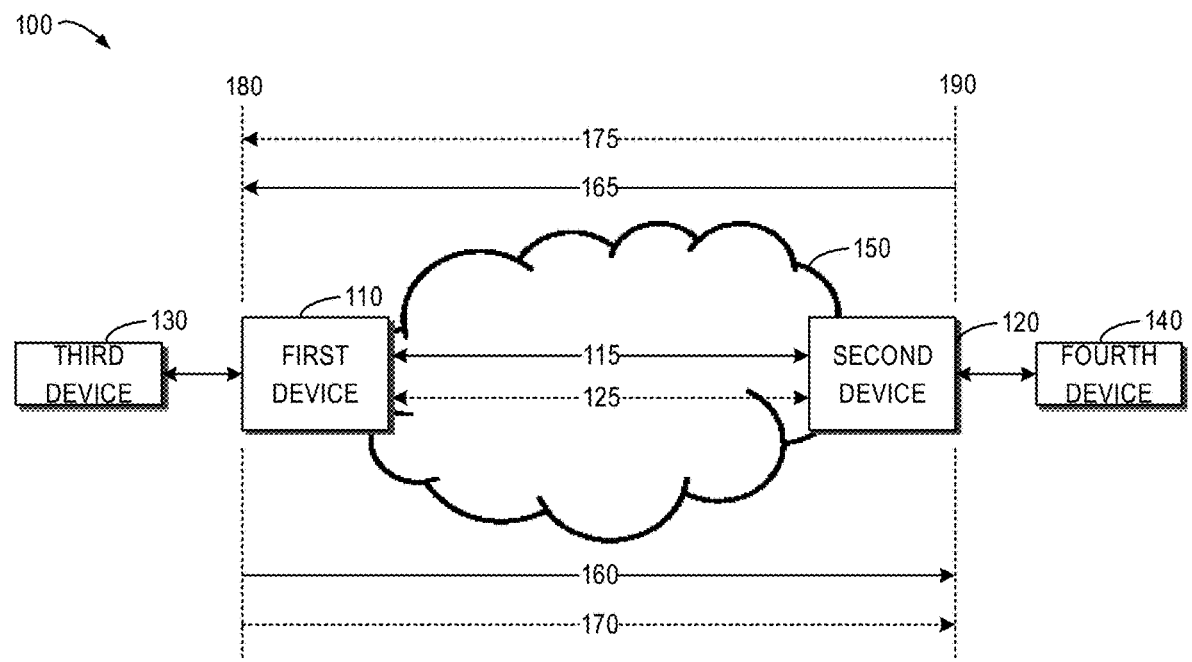
FIG. 1 illustrates a schematic diagram of an example communication system in which embodiments of the present disclosure can be implemented.

Throughout the drawings, same or similar reference signs are used to represent same or similar components.

DETAILED DESCRIPTION OF EMBODIMENTS

Principles and spirits of the present disclosure will be described below with reference to various example embodiments illustrated in the drawings. It should be appreciated that description of those embodiments is merely to enable those skilled in the art to better understand and implement the present disclosure and is not intended for limiting the scope of the present disclosure in any manner. In the following description and claims, the technical terms and scientific terms used herein express the meanings generally understood by those ordinary skilled in the art unless indicated otherwise.

As used herein, the term "includes" and its variants are to be read as open-ended terms that mean "includes, but is not limited to." The term "based on" is to be read as "based at least in part on." The term "one embodiment" or "the embodiment" is to be read as "at least one embodiment." The terms "first", "second" and so on can refer to same or different objects and are used only for differentiating the represented objects without suggesting any particular spatial sequences, temporal sequences or orders of importance etc. In some embodiments, values, procedures, selected items, determined projects, devices, apparatuses, means, components, assemblies are described as "optimal," "lowest," "highest," "minimum" and maximum etc. It should be understood that such descriptions are intended to indicate that a choice may be made out of many available functional options and the selected option is not required to be better, lower, higher, smaller, bigger or more preferable than other options in a further aspect or all aspects.

As used herein, the term "determine" encompasses a variety of actions, for example, "determine" may include computation, calculation, export, research, look up (such as looking up in a table, a database or a further data structure), find out and the like. Additionally, "determine" may include receiving (e.g., receiving information), accessing (e.g., accessing data in the memory) and the like. Moreover, "determine" may include parsing, choice, selecting, establishing and the like.

As used herein, the term "communication network" or "communication system" refers to a network or system in compliance with any suitable communication standards, such as Long Term Evolution (LTE), LTE-Advanced (LTE-A), Wideband Code Division Multiple Access (WCDMA), High Speed Packet Access (HSPA) and Narrow Band Internet of Things (NB-IoT) etc. In addition, the communication between terminal devices and network devices/other communication devices in the communication network or communication system may be carried out in accordance with any appropriate communication protocols, including but not limited to, First Generation (1G), Second Generation (2G), 2.5G, 2.75G, Third Generation (3G), Fourth Generation (4G), 4.5G and Fifth Generation (5G) communication protocols, and/or any other currently known or to be developed protocols. In other words, embodiments of the present disclosure can be applied into a variety of communication systems. In view of the rapid development of the communication, it is certain that the present disclosure also includes embodiments embodying the communication technologies and systems of future type. Therefore, the scope of the present disclosure should not be restricted to the application of the above systems only.

As used herein, the term "network device" refers to an entity or node having a particular function in a communication or computing network. As an example, the network device may include, but is not limited to, an access device, "base station" (BS), Node B (Node B or NB), evolution Node B (eNode B or eNB), Generation Node B (gNB), remote radio unit (RRU), radio frequency head (RH), remote radio head (RRH), relay, low power nodes (such as pico base station or femto base station and so on), router, gateway, switch, bridge, wireless access point, firewall, mainframe or large-scale server, cloud computing device, mobile phone, site, unit, general-purpose computing device, multimedia computing device, multimedia tablet, Internet node, communicator, desktop computer, laptop computer, notebook computer, netbook computer, tablet computer, Personal Communication System (PCS) device, personal navigation device, Personal Digital Assistant (PDA), audio/video player, digital camera/video camera, positioning device, television receiver, radio receiver, e-book device, gaming device or other devices available for communication or any combination thereof.

The term "terminal device" indicates any terminal devices capable of performing wired or wireless communication with base stations or with each other. As an example, the terminal device may include, but is not limited to, mobile terminal (MT), Virtual Reality (VR) or Augmented Reality (AR) device (such as AR glasses), subscriber station (SS), portable subscriber station (PSS), mobile station (MS) or access terminal (AT), aerocraft and the above devices mounted on vehicles etc. The terminal device may be mobile terminal, fixed terminal or portable terminal of any type, including a mobile phone, site, unit, device, multimedia computer, multimedia tablet, Internet node, communicator, desktop computer, laptop computer, notebook computer, netbook computer, tablet computer, Personal Communication System (PCS) device, personal navigation device, Personal Digital Assistant (PDA), audio/video player, digital camera/video camera, positioning device, television receiver, radio receiver, e-book device, gaming device, Internet of Things (IoT) or other devices available for communication or any combination thereof.

As used herein, the term "circuit" represents one or more of: (a) implementations of hardware circuit only (e.g., implementations of analog and/or digital circuit alone); and (b)

combinations of hardware circuit and software, for example (if applicable): (i) combinations of analog and/or digital hardware circuit and software/firmware, and (ii) any part(s) of a hardware processor and software (including operating in combination to enable apparatuses like computing device etc. to implement digital signal processors, software and memories of various functions); and (c) hardware circuit and/or processor, for example, a microprocessor or a part thereof, requires software (such as firmware) for operation, but is free of software when there is no operation for it.

The definition of circuit is applicable to all scenarios whenever it is used in the present application (including the claims). As a further example, the term "circuit" herein also covers implementations of hardware circuit or processor (or a plurality of processors) only, implementations of a part of the hardware circuit or processor, or implementations of attached software or firmware. For example, the term "circuit", if applicable to specific claim elements, also covers baseband integrated circuits or processor integrated circuits or similar integrated circuits in other computing devices.

As mentioned above, in IEEE 1914.3-2018 or P1914.3a Standards, presentation time offsets are utilized to control the entire end-to-end delay of data transmission between the communication devices (e.g., RoE endpoints), so as to achieve the phase-alignment of transmission of data between two communication devices. In an example scenario, radio data may be transmitted between a Baseband Processing Unit (BBU) and a Remote Radio Unit (RRU) based on the RoE standard. In each direction of a radio connection between the Baseband Processing Unit and Remote Radio Unit, the first communication device (e.g., RoE transmitter) that transmits data may use a common time reference (e.g., Time of Day ToD defined in IEEE 1588 Standard) to timestamp the radio data (e.g., a radio frame), so as indicate the arrival time of the radio data at the first communication device, and compute a presentation time when the radio data is to be presented over a radio link of the second communication device (e.g., an RoE receiver) that receives the data. For example, the presentation time may be equal to the above arrival time plus the desired presentation time offset. Accordingly, the presentation time also may be known as the arrival time offset.

The first communication device may insert the resulting presentation time into a header of an RoE packet generated based on the radio data. The RoE packet may carry the radio data in payload. The second communication device may recover the radio data from the received RoE packet and obtain the designated presentation time in the RoE packet. After that, the second communication device may send the radio data at the exact time designated by the presentation time. In such way, the end-to-end latency of the radio data between the first device and the second device may be controlled to be exactly equal to the presentation time offset. In the text, the terms "delay" and "latency" may be used interchangeably if no confusion are caused.

In a conventional solution, the presentation time offset is manually configured by an operator of the communication system and the configuration may be complicated and tedious to the operator. Therefore, it is desirable that the communication device may automatically set the presentation time offset in accordance with the transmission delay of the data during communication. However, the data transmission delay may be varied in different communication directions. Besides, it is generally required that the presentation time offsets in different communication directions are set to be the same, so as to align the presentation time offsets in two different communication directions to satisfy the symmetric delay between an uplink path and a downlink path as required, for example, by the CPRI standard and the like. To be specific, it is required that the delay on uplink path and the delay on downlink path are symmetrical for the CPRI protocol data in the RoE applications. As a result, the presentation time offset in the downlink RoE mapper and the presentation time offset in the uplink RoE mapper should be set to be equal.

Although the above analysis is directed to the RoE protocol, the general principle followed by the two communication devices to separately configure respective presentation time offsets may be applicable to any appropriate communication systems. That is, in order to enable the communication device to automatically set the presentation time offset, each communication device of the involved two parties may need to determine a presentation time offset in a communication direction according to the end-to-end transmission delay in the corresponding communication direction, and then the communication device on one side may align the presentation time offset in the corresponding communication direction with the presentation time offset in a further direction determined by the peer communication device. However, there currently still lacks a feasible technical solution for aligning the presentation time offsets in different communication directions between the communication devices.

In view of the above and other potential problems in the conventional solution, embodiments of the present disclosure propose a technical solution of automatically aligning the presentation time offsets in different communication directions (e.g., the uplink direction and downlink direction in the CPRI protocol). For example, the solution may be applied in an initialization or protection switching scenario of the communication link. The basic idea of the technical solution is to (e.g., periodically) inform a communication device of a presentation time offset determined in the peer communication device. Additionally, each communication device may adjust its own presentation time offset based on the larger one of the presentation time offset of its own and the peer presentation time offset. After the presentation time offset of its own is equal to the peer presentation time offset, the communication device may perform the communication from its own to the peer device using its own presentation time offset. At this time, the communication device, for example, may configure its own presentation time offset into its hardware. Through the embodiments of the present disclosure, the two communication devices may automatically align the presentation time offsets in different communication directions without intervention from an operator, thereby enhancing the level of automation of the communication devices in setting the presentation time offset. Several embodiments of the present disclosure are described below in details with reference to the drawings.

FIG. 1 illustrates a schematic diagram of an example communication system 100 in which embodiments of the present disclosure can be performed. As shown in FIG. 1, the example communication system (also known as example communication network) 100 may include the first device 110 and the second device 120 and they implement a two-way communication via a communication link 115. For example, the first device 110 may transmit data to the second device 120 via the communication link 115 in the first communication direction from the first device 110 to the second device 120. Besides, the second device 120 may transmit data to the first device 110 via the communication link 115 in the second communication direction from the second device 120 to the first device 110. As used herein, the data may generally indicate any information transmitted during communication, including but not limited to, target contents to be transmitted during the communication or control information facilitating communication and the like.

In some embodiments, the communication link 115 may be referred to as a working path 115 between the first device 110 and the second device 120, that is, primary communication link or path. In a scenario where the working path 115 is not applied into communication due to failure or other reasons, the first device 110 and the second device 120 also may implement a two-way communication via a communication link 125. For example, the first device 110 may transmit data to the second device 120 via the communication link 125 in the first communication direction from the first device 110 to the second device 120. Besides, the second device 120 may transmit data to the first device 110 via the communication link 125 in the second communication direction from the second device 120 to the first device 110. In these embodiments, the communication link 125 may be known as a protection path relative to the working path 115. This means that the protection path 125 may act as a backup communication link or path of the working path 115. It is certain that function, in other embodiments, effect or status of the working path 115 and the protection path 125 may be identical or equivalent. In other words, the working path 115 and the protection path 125 are not differentiated in the sequence of use or priority. On the contrary, they are the backup communication links or paths for each other.

Additionally, when both the working path 115 and the protection path 125 are present between the first communication 110 and the second communication 120, the path that is currently used for the communication between the first device 110 and the second device 120 may be known as active path while the other path not used for the communication may be referred to as inactive path. For example, if the first device 110 and the second device 120 are communicating via the working path 115, the working path 115 is the active path while the protection path 125 is the inactive path. Conversely, if the first device 110 and the second device 120 are communicating via the protection path 125, the protection path 125 is the active path while the working path 115 is the inactive path. It is certain that the working path 115 and the protection path 125 may also be used simultaneously for the communication between the first device 110 and the second device 120 in some cases. In this case, both the working path 115 and the protection path 125 may be referred to as the active paths. Further, if there are other communication links or paths acting as the active path between the first device 110 and the second device 120, both the working path 115 and the protection path 125 may also be inactive paths.

In some embodiments, the data transmitted from the first device 110 to the second device 120 may be input from the third device 130 and output to the fourth device 140 by the second device 120. Similarly, the data transmitted from the second device 120 to the first device 110 may be input from the fourth device 140 and output to the third device 130 by the first device 110. That is, the data communication between the third device 130 and the fourth device 140 is implemented through the data communication between the first device 110 and the second device 120 via the working path 115 or the protection path 125. During the communication, the first device 110 may convert the data in the first data form (e.g., CPRI protocol-based) from the third device 130 into the second data form (e.g., a packet) adapted to be transmitted via the working path 115 or the protection path 125. Besides, the second device 120 may recover the data in the first data form from the data in the second data form, to provide the data in the first data form to the fourth device 140. Similarly, the second device 120 may convert the data in the first data form from the fourth device 140 into the second data form (e.g., a packet) adapted to be transmitted via the working path 115 or the protection path 125. While, the first device 110 may recover the data in the first data form from the data in the second data form, to provide it to the third device 130.

As shown in FIG. 1, in some embodiments, the working path 115 and the protection path 125 may be two different communication links in a network 150. Generally, the network 150 may be any network capable of transmitting data to implement communication between devices, and the first device 110 and the second device 120 may be part of the network 150. For example, the network 150 may include, but is not limited to, a computer network, a communication network or other wired or wireless networks and the like. In some embodiments, the network 150 may be an Ethernet. In such case, the working path 115 and the protection path 125 may be two different Ethernet links, and the first device 110 and the second device 120 may be any communication devices or network devices in the Ethernet. In addition, the third device 130 and the fourth device 140 may not belong to the Ethernet. In other embodiments, however, the third device 130 and the fourth device 140 also may be part of the network 150 (e.g., the Ethernet).

In some embodiments, the first device 110 and the second device 120 may be RoE protocol-compliant devices, such as an RoE switch or RoE node. More specifically, in the communication where the first device 110 transmits the data to the second device 120, the first device 110 may be known as an RoE transmitter and the second device 120 may be referred to as an RoE receiver. Similarly, in the communication where the second device 120 transmits the data to the first device 110, the second device 120 may be known as an RoE transmitter and the first device 110 may be referred to as an RoE receiver.

In the RoE protocol-based embodiments, the third device 130 connected to the first device 110 may be a baseband processing unit of the network device in a wireless communication network, and the fourth device 140 connected to the second device 120 may be a remote radio unit of the network device in the wireless communication network. It is certain that the third device 130 may be a remote radio unit while the fourth device 140 may be a baseband processing unit in further embodiments. If the third device 130 is a baseband processing unit and the fourth device 140 is a remote radio unit, the communication link or path from the third device 130 to the fourth device 140 may be referred to as an uplink or uplink path, and the communication link or path from the fourth device 140 to the third device 130 may be known as a downlink or downlink path. Conversely, if the functions of the third device 130 and the fourth device 140 are swapped, the uplink or uplink path goes to an opposite direction.

Therefore, the first device 110 and the second device 120 can implement the data communication between a baseband processing unit and a remote radio unit. The data transmission between the baseband processing unit and the remote radio unit is usually based on CPRI protocol. Accordingly, in the communication based on the RoE Standard, the third device 130 may supply CPRI protocol data to the first device 110. Then, the first device 110 may generate Ethernet packets based on the CPRI protocol data and transmit to the second device 120 via the working path 115 or the protection path 125. Next, the second device 120 may extract the CPRI protocol data from the received Ethernet packets and provide to the fourth device 140. Similarly, in the communication based on RoE Standard, the fourth device 140 may also provide CPRI protocol data to the second device 120. The second device 120 may subsequently generate Ethernet packets based on the CPRI protocol data and transmit to the first device 110 via the working path 115 or the protection path 125. Next, the first device 110 may extract the CPRI protocol data from the received Ethernet packets and provide to the third device 130.

In some embodiments, the RoE transmitter, as the sender of the CPRI protocol data, may include an RoE mapper for converting the data in the first data form (e.g., CPRI protocol data) into the second data form (e.g., Ethernet packets). Being a receiving party of the CPRI protocol data, the RoE receiver may include an RoE de-mapper for converting the data in the second data form back to the first data form. Because the RoE switch usually serves as the RoE transmitter as well as the RoE receiver, the RoE switch may include both the RoE mapper and the RoE de-mapper.

It is to be explained although the baseband processing unit and the remote radio unit are described above as the examples of the third device 130 and the fourth device 140, it is only exemplary without suggesting any restrictions over the scope of the present disclosure. In further embodiments, the third device 130 and the fourth device 140 may be any devices demanding communication. In other words, the first device 110 and the second device 120 may be connected between any two devices to implement data transmissions between the two devices.

In some embodiments, to achieve phase-alignment of the transmission of the data (e.g., radio data) between the third device 130 and the fourth device 140 and meet the latency requirement of the data transmission between the third device 130 and the fourth device 140, the first device 110 and the second device 120 may set the presentation time for the data transmitted therebetween, such that the data transmitted between the first device 110 and the second device 120 has the same transmission time or transmission latency. As used herein, "presentation time" may generally refer to a time point at which the data is output from a peer communication device, while "presentation time offset" may represent an offset of time point at which data is output from the receiving communication device relative to a time point when the data is input to the transmitting communication device.

To further explain the presentation time and the presentation time offset, the transmission of data from the first device 110 to the second device 120 is illustrated as an example. The time point at which the data is input to or arrives at the first device 110 may be referred to as "Arrival Time". Afterwards, the first device 110 may set for the data a time point at which it is to be output from the second device 120, that is, the presentation time, and transmit the presentation time and the data together or in an associated manner to the second device 120. The time offset of the presentation time relative to the arrival time may be referred to as the first presentation time offset (or the first arrival time offsets) 160. That is, the first presentation time offset 160 may indicate a time period from data being input to the first device 110 to the data being output from the second device 120. FIG. 1 schematically depicts a time reference plane 180 (i.e., arrival time) when the data is input to the first device 110 and a time reference plane 190 (i.e., presentation time) when the data is output from the second device 120. Accordingly, the first presentation time offset 160 may be a time offset of the reference plane 190 relative to the reference plane 180. After receiving the data transmitted by the first device 110 and the indicated presentation time, the second device 120 may output the data to the fourth device 140 at a time point of the reference plane 190 designated by the presentation time.

Similarly, when the data is transmitted from the second device 120 to the first device 110, the time point at which the data is input to or arrives at the second device 120 may be referred to as "arrival time". Then, the second device 120 may set for the data the time point at which it is to be output from the first device 110, i.e., the presentation time, and transmit the presentation time and the data together or in an association matter to the first device 110. The time offset of the presentation time relative to the arrival time may be known as the second presentation time offset (or the second arrival time offset) 165. In other words, the second presentation time offset 165 may indicate a time period from data being input to the second device 120 to the data being output from the first device 110. In such case, the reference plane 190 refers to the reference plane (i.e., arrival time) when the data is input to the second device 120 while the reference plane 180 indicates the reference plane (i.e., presentation time) when the data is output from the first device 110. Accordingly, the second presentation time offset 165 may be a time offset of the reference plane 180 relative to the reference plane 190. After receiving the data transmitted by the second device 120 and the indicated presentation time, the first device 110 may output the data to the third device 130 at the time point of the reference plane 180 designated by the presentation time. It should be noted that the reference plane 180 and the reference plane 190 are depicted for the purpose of illustration only and the first presentation time offset 160 and the second presentation offset 165 are not necessarily equal to each other all the time.

It is also to be noted that the first presentation time offset 160 and the second presentation time offset 165 are described above with respect to the working path 115 between the first device 110 and the second device 120. It should be appreciated that if the protection path 125 is present between the first device 110 and the second device 120, data transmission delays on the working path 115 and the protection path 125 may be different because they are different physical communication links. When the transmission delays over the working path 115 and the protection path 125 are different, their presentation time offsets are often varied. Therefore, the first device 110 and the second device 120 may set to the first presentation time offset 170 and the second presentation time offset 175 for the protection path 120 in a way similar to the first presentation time offset 160 and the second presentation time offset 165 for the working path 115. For example, the first presentation time offset 170 associated with the protection path 125 may be set by the first device 110, for transmitting data from the first device 110 to the second device 120 via the protection path 125. Likewise, the second presentation time offset 175 associated with the protection path 125 may be set by the second device 120, for transmitting data from the second device 120 to the first device 110 via the protection path 125.

In the context of the present disclosure, the first presentation time offset may indicate, in a generalized manner, the presentation time offset in the first direction from the first device 110 to the second device 120, while the second presentation time offset may refer to the presentation time offset in the second direction from the second device 120 to the first device 110 in the same generalized way. More specifically, when a plurality of paths is present between the first device 110 and the second device 120, such as working path 115 and protection path 125, the first presentation time offset may include the first presentation time offset 160 associated with the working path 115, or the presentation time offset 170 associated with the protection path 125 and the like, and the second presentation time offset may include the second presentation time offset 165 associated with the working path 115, or the second presentation time offset associated with the protection path 125 and the like.

It should be appreciated that FIG. 1 only schematically illustrates devices, units, modules, components or elements in the example communication system 100 related to the embodiments of the present disclosure. In practice, the example communication system 100 also may include other devices, units, modules, components or elements having other functions. In addition, the specific number and connections of the devices, units, modules, components or elements as illustrated in FIG. 1 are exemplary only and are not intended for restricting the scope of the present disclosure in any manner. In other embodiments, the example communication system 100 may include any suitable number of the first devices, the second devices, the third devices, the fourth devices or other devices or elements and they may have any appropriate connections with one another. Therefore, embodiments of the present disclosure may be generally applied to any technical environments in which two or more communication devices communicate via communication links, rather than being restricted to the specific devices, units, modules, components or elements depicted in FIG. 1.

Besides, connections or links between various devices in the example communication system 100 may be any forms of connections or coupling capable of implementing data communication or control signal communication between respective devices or components of the example communication system 100, including but not limited to, coaxial cables, fiber-optic cables, twisted pairs, or wireless technologies (such as infrared, radio or microwave). In some embodiments, the chains or links also may include, but is not limited to, devices for network connections like network card, hub, modem, relay, bridge, switch, router and the like, and a variety of network connections, wireless links and the like. In some embodiments, the connections or links may include buses of various types. In other embodiments, the connections or links may include computer network, communication network, or other wired or wireless network.

It should be appreciated that communication in the example communication system 100 may be implemented in accordance with any appropriate communication protocols, including but not limited to, First Generation (1G), Second Generation (2G), Third Generation (3G), Fourth Generation (4G) and Fifth Generation (5G) of cellular communication protocol, wireless local area network communication protocols such as Institute of Electrical and Electronic Engineers (IEEE) 802.11 or other IEEE protocols, and/or any other protocols currently known or to be developed. Furthermore, the communication may utilize any suitable wireless or wired communication technologies, including but not limited to, Code Division Multiple Access (CDMA), Frequency Division Multiple Access (FDMA), Time Division Multiple Access (TDMA), Frequency Division Duplexing (FDD), Time Division Duplexing (TDD), Multiple Input Multiple Output (MIMO), Orthogonal Frequency Division Multiplexing (OFDM), Discrete Fourier Transform-Spread OFDM (DFT-s-OFDM), and/or any other techniques currently known or to be developed.

Figure 2:
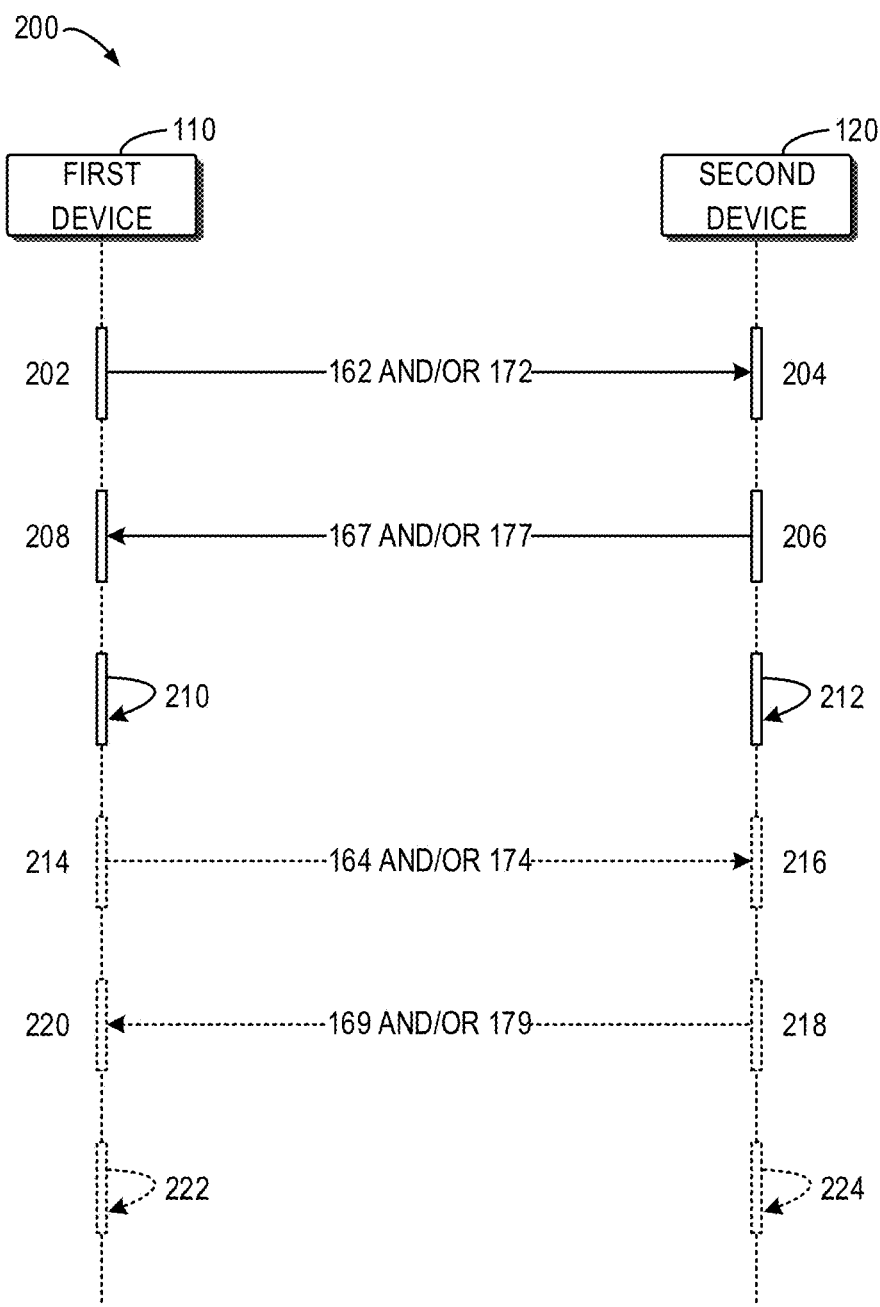
FIG. 2 illustrates a schematic diagram of an example communication process between the first device and the second device in accordance with embodiments of the present disclosure.

The example communication processes between the first device 110 and the second device 120 are described below with reference to FIGS. 2 to 4. As a result, the first device 110 and the second device 120 may automatically align the presentation time offsets in different communication directions. FIG. 2 illustrates a schematic diagram of an example communication 200 between the first device 110 and the second device 120 in accordance with embodiments of the present disclosure. For the purpose of illustration, the example communication process 200 is described with reference to FIG. 1. However, it should be appreciated that the example communication process 200 may also be equivalently applied to any other appropriate scenarios in which two or more communication devices or other devices communicate with each other.

As shown in FIG. 2, after the first initial duration 162 of the first presentation time offset 160 associated with the working path 115 is determined, the first device 110 may transmit (202) the first initial duration 162 to the second device 120. It is to be appreciated that the first device 110 may determine the first initial duration 162 of the first presentation time offset 160 using any suitable manners. In some embodiments, the first device 110 may set the first initial duration 162 of the first presentation time offset 160 according to empirical values. The empirical values, for example, may be obtained from historical data or statistical data associated with the working path 115. In other embodiments, the first device 110 may set the first initial duration 162 of the first presentation time offset 160 according to performance parameters and operating conditions of the first device 110, the working path 115 and the second device 120. In further embodiments, the first device 110 may first determine a network end-to-end delay associated with the working path 115. As used herein, the network end-to-end delay refers to a delay related to the network transmission of the data between the first device 110 and the second device 120 exclusive of data buffer time, thus being different from the total end-to-end delay including the data buffer time corresponding to the entire presentation time offset. In the text, the term "network end-to-end delay" may also be referred to as "end-to-end delay" for short if no confusion is caused. Subsequent to determining the end-to-end delay, the first device 110 may set the first initial duration 162 of the first presentation time offset 160 based on the end-to-end delay. Such an example will be described in detail below with reference to FIG. 5.

When the protection path 125 is present between the first device 110 and the second device 120, the first device 110 may also transmit (202) the first initial duration 172 to the second device 120 after determining the first initial duration 172 of the first presentation time offset 170 associated with the protection path 125. Similarly, the first device 110 may determine the first initial duration 172 of the first presentation time offset 170 using any suitable manners. In some embodiments, the first device 110 may set the first initial duration 172 of the first presentation time offset 170 according to empirical values. The empirical values, for example, may be obtained from historical data or statistical data associated with the protection path 125. In other embodiments, the first device 110 may set the first initial duration 172 of the first presentation time offset 170 according to performance parameters and operating conditions of the first device 110, the protection path 125 and the second device 120. In further embodiments, the first device 110 may determine an end-to-end delay associated with protection path 125 in the first place and then set the first initial duration 172 of the first presentation time offset 170 based on the end-to-end delay associated with the protection path 125. Such example will be described in detail below with reference to FIGS. 5 and 6.

It should be noted that on the assumption that both the working path 115 and the protection path 125 are present, where the working path 115 is the active path and the protection path 125 is the inactive one, the first device 110 may transmit (202), on the working path 115 and to the second device 120, either or both of the first initial duration 162 for the working path 115 and the first initial duration 172 for the protection path 125. In some embodiments, the first device 110 may periodically determine the first initial duration 162 and the first initial duration 172 and then transmit (202) either or both of them to the second device 120. In this way, the first device 110 may periodically update the first initial duration 162 and the first initial duration 172, such that the setting of the first presentation time offset 160 and the second presentation time offset 170 may adapt to changes in the technology environment of data transmission. As shown in FIG. 2, the second device 120 at the other side of the example communication process 200 may correspondingly receive (204), from the first device 110, the first initial duration 162, or the first initial duration 172 or both.

In some embodiments, the first device 110 may transmit (202) to the second device 120 the first initial duration 162, or the first initial duration 172 or both via a header of the RoE data packet (e.g., a few bits in the packet header). Accordingly, either or both of the first initial duration 162 and the first initial duration 172 may be carried incidentally in the packets for transmitting other data or information, so as to save the transmission resources or signaling resources between the first device 110 and the second device 120. Alternatively or additionally, the first device 110 also may transmit (202) either or both of the first initial duration 162 and the first initial duration 172 to the second device 120 via a dedicated RoE control packet. In this way, the transmission of the first initial duration 162 or the first initial duration 172 or both becomes more flexible without occupying the transmission resources or signaling resources for transmitting other data or information. More generally, the first device 110 may transmit (202) either or both of the first initial duration 162 and the first initial duration 172 to the second device 120 through any suitable messages, packets, signaling or similar forms. An example of the dedicated RoE control packet for transmitting the presentation time offset between the first device 110 and the second device 120 is described below with reference to FIG. 3.

Figure 3:
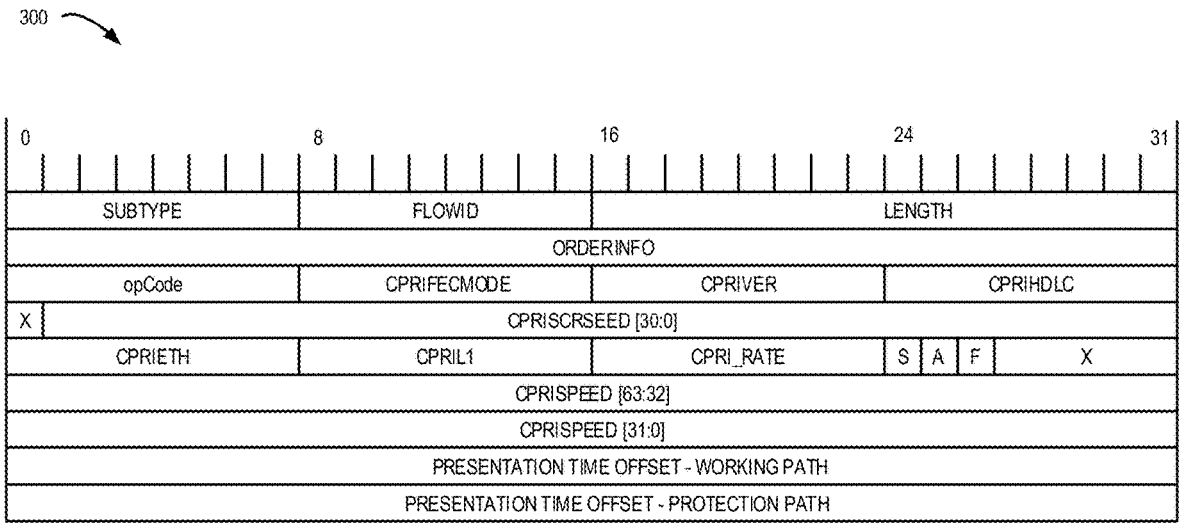
FIG. 3 illustrates an example of a dedicated control packet for transmitting a presentation time offset in accordance with embodiments of the present disclosure.

FIG. 3 illustrates an example of a dedicated control packet 300 for transmitting the presentation time offset in accordance with embodiments of the present disclosure. In some embodiments, the control packet 300 may be extended from a status control packet of the RoE mapper. In other embodiments, the control packet 300 may also be obtained from any other packets based on the RoE standard. As shown in FIG. 3, the control packet 300 may include a plurality of fields, for example, a subType field, flowID field, length field, orderInfo field, opCode field, CPRIFECMODE field, CPRIVER field, CPRIHDLC field, CPRISCRSEED field, CPRIETH field, CPRIL1 field, CPRI_RATE field, S(LOS_DFCT) field, A(LOA_DFCT) field, F(CPRI_LOF_DFCT) field, CPRISPEED field and the like. It should be appreciated that names and lengths (i.e., bit number) of respective fields illustrated in FIG. 3 are only exemplary without suggesting any restrictions to the scope of the present disclosure. In other embodiments, the control packet 300 may include more or fewer fields, fields with different names, fields having various contents, fields of different lengths and the like.

Among the above fields, the subType field may include 8 bits and may be used to define the type of the flow carried by the RoE packet and the subtype of the RoE. The flowID field may include 8 bits and may identify specific flows. In the control packet 300, the flowID field may be set to all 1 value. The length field may include 16 bits and may indicate the total number of octets after the header of the RoE packet. The orderInfo field may include 32 bits and may include a sequence number or timestamp. In the control packet 300, the orderInfo field may include sequence numbers irrelevant to any temporal properties. The opCode field may include 8 bits and may define additional control subtypes. The CPRIFECMODE field may include 8 bits and may indicate whether the CPRI flow disables or enables RS Forward Error Correction (RS-FEC). The CPRIVER field may include 8 bits and may indicate the version of the CPRI protocol. The CPRIHDLC field may include 8 bits and may indicate a High-level Data Link Control (HDLC) rate of CPRI slow Control and Management (C&M) channel.

The CPRISCRSEED field may include 31 bits and may indicate a 31-bit scrambling seed of the CPRI flow. The CPRIETH field may contain 8 bits and may indicate a starting position of the fast C&M channel of the CPRI. The CPRIL1 field may include 8 bits and may indicate status of SDI alarm, RAI alarm, LOS alarm and LOF alarm and relay a reset notification status or a reset confirmation status, where SDI represents Service Access Point (SAP) Defect Indication, RAI indicates Remote Alarm Indication, LOS denotes Loss of Signal and LOF indicates Loss of Frame. The LOS_DFCT field may include 1 bit and denote the status of the LOS event. The LOA_DFCT field may include 1 bit and indicate the status of an alignment loss event. The CPRI_LOF_DFCT field may include 1 bit and may present the status of a CPRI frame loss event. The CPRISPEED field may include 64 bits and represent a nominal rate of the CPRI flow. X bit may denote the reserved bits. It should be noted that meanings or functions of the above fields or other fields in the control packet 300 may be determined with reference to the IEEE 1914.3-2018 or P1914.3a Standard and similar standards or protocols to be developed in the future.

As further illustrated in FIG. 3, the control packet 300 may also include "presentation time offset-working path" field and "presentation time offset-protection path" field. The "presentation time offset-working path" field may be provided to indicate the first presentation time offset 160 for the working path 115 calculated by the first device 110 (e.g., a RoE mapper in the first device 110), for example, the first initial duration 162 of the first presentation time offset 160. The "presentation time offset-protection path" field may be used for indicating the first presentation time offset 170 for the protection path 125 calculated by the first device 110 (e.g., RoE mapper in the first device 110), for example, the first initial duration 172 of the first presentation time offset 170. As a result, subsequent to determining the first initial duration 162 for the working path 115 and the first initial duration 172 for the protection path 125, the first device 110 may fill them into the above two fields in the control packet 300 respectively and then transmit (202) the control packet 300 to the second device 120. It should be noted that although "presentation time offset-working path" field and "presentation time offset-protection path" field include 32 bits as described in FIG. 3, this is only exemplary without suggesting any restrictions to the scope of the present disclosure. In other embodiments, the "presentation time offset-working path" field and the "presentation time offset-protection path" field may include any suitable number of bits. In addition, the two fields may include same or different numbers of bits.

Additionally or alternatively, the control packet 300 may include "presentation time offset-active path" field allowing the first device 110 to indicate the presentation time offset for the active path determined by the first device 110 to the second device 120 and "presentation time offset-inactive path" field enabling the first device 110 to indicate the presentation time offset for the inactive path determined by the first device 110 to the second device 120. Of course, the "presentation time offset-active path" field in the control packet 300 also may be used by the second device 120 to indicate the presentation time offset for the active path determined by the second device 120 to the first device 110. Besides, the "presentation time offset-inactive path" may also be employed by the second device 120 to indicate the presentation time offset for the inactive path determined by the second device 120 to the first device 110. Furthermore, it should be appreciated that the working path 115 may act as the active or inactive path and the protection path 125 may also serve as the active or inactive path. It also should be appreciated that the "presentation time offset-active path" field and the "presentation time offset-inactive path" field may include any suitable number of bits, and the two fields may include same or different numbers of bits.

Returning to FIG. 2, after determining the second initial duration 167 of the second presentation time offset 165 associated with the working path 115, the second device 120 may transmit (206) the second initial duration 167 to the first device 110 in a similar way. It should be appreciated that the second device 120 may determine the second initial duration 167 of the second presentation time offset 165 in a way similar to the determination of the first initial duration 162 by the first device 110. Besides, when the protection path 125 is present between the first device 110 and the second device 120, the second device 120 may also transmit (206) the second initial duration 177 to the first device 110 after determining the second initial duration 177 of the second presentation time offset 175 associated with the protection path 125. Likewise, the second device 120 may determine the second initial duration 177 of the second presentation time offset 175 in a way similar to the determination of the first initial duration 172 by the first device 110.

It should be noted, assuming both the working path 115 and the protection path 125 are present, where the working path 115 is the active path and the protection path 125 is the inactive path, then the second device 120 may transmit (206), on the working path 115 and to the first device 110, the second initial duration 167 for the working path 115 alone, or the second initial duration 177 for the protection path 125 alone or both at the same time. In some embodiments, the second device 120 may periodically determine the second initial duration 167 and the second initial duration 177 and then transmit (206) either or both of them to the first device 110. In this way, the second device 120 may regularly update the second initial duration 167 and the second initial duration 177, such that the second presentation time offset 165 and the second presentation time offset 175 may adapt to changes in the data transmission technology environment. As shown in FIG. 2, the first device 110 at the other side of the example communication process 200 may correspondingly receive (208), from the second device 120, the second initial duration 167 or the second initial duration 177 or both.

In some embodiments, the second device 120 may transmit (206) to the first device 110 the second initial duration 167 or the second initial duration 177 or both via a header of the RoE data packet (e.g., a few bits in the packet header). Accordingly, either or both of the second initial duration 167 and the second initial duration 177 may be carried incidentally in the packets that transmit other data or information, so as to save the transmission resources or signaling resources between the first device 110 and the second device 120. Alternatively or additionally, the second device 120 may also transmit (206) either or both of the second initial duration 167 and the second initial duration 177 to the first device 110 via a dedicated RoE control packet (e.g., the control packet 300 in FIG. 3).

For example, when the second initial duration 167 for the working path 115 and the second initial duration 177 for the protection path 125 have been determined, the second device 120 may fill them into the "presentation time offset-active path" field and the "presentation time offset-inactive path" field in the control packet 300 respectively and then transmit (206) the control packet 300 to the first device 110. Accordingly, by adding the above two fields into the control packet 300, the first device 110 and the second device 120 may automatically negotiate the presentation time offset in different directions. For example, these presentation time offsets may be the CPRI information in the IEEE 1914.3-2018 or P1914.3a Standard. The flexibility of transmission of the second initial duration 167 or the second initial duration 177 or both via the dedicated RoE control packet is improved without occupying the transmission resources or signaling resources for transmitting other data or information. More generally, the second device 120 may transmit (206) either or both of the second initial duration 167 and the second initial duration 177 to the first device 110 through any suitable message, packet, signaling or similar form.

Continuing to refer to FIG. 2, after receiving (208) the second initial duration 167 of the second presentation time offset 165 from the second device 120, the first device 110 may determine (210) the first adjusted duration 164 of the first presentation time offset 160 based on the longer one of the first initial duration 162 and the second initial duration 167. In other words, the first device 110 may adjust the first presentation time offset 160 based on the longer one mentioned above for consistency of the presentation time offset in two directions. In some embodiments, the first device 110 may directly determine the longer one of the first initial duration 162 and the second initial duration 167 as the first adjusted duration 164. For example, it is assumed that the first initial duration 162 determined by the first device 110 is 100 microseconds and the second initial duration 167 received from the second device 120 is 102 microseconds, then the first device 110 may determine the longer one (i.e., 102 microseconds) of the first initial duration 162 and the second initial duration 167 as the first adjusted duration 164. As such, the adjustment of the first presentation time offset 160 by the first device 110 may be simplified to lower the processing overheads of the first device 110.

In other embodiments, the first device 110 may also determine the first adjusted duration 164 based on the longer one mentioned above in any other suitable ways. For example, the first device 110 may take the above longer one added with a predetermined increment as the first adjusted duration 164. Still referring to the above example, the first device 110 may add a predetermined increment of 1 microsecond to the longer one of 102 microseconds, to determine the first adjusted duration 164 as 103 microseconds. Accordingly, as the first adjusted duration 164 of the first presentation time offset 160 is set to a greater value, the transmission of the data from the first device 110 to the second device 120 is more reliable. It should be understood that the specific values of the various durations are listed as examples only without suggesting any restrictions to the scope of the present disclosure. In other embodiments, the respective durations in the text may have any suitable values.

It should be noted that the above process in which the first device 110 determines the first adjusted duration 164 is for the working path 115. When the protection path 125 is present between the first device 110 and the second device 120, the first device 110 may determine (210) the first adjusted duration 174 of the first presentation time offset 170 for the protection path 125 in the same way. Specifically, the first device 110 may determine (210) the first adjusted duration 174 of the first presentation time offset 170 based on the longer one of the first initial duration 172 and the second initial duration 177. In other words, the first device 110 may adjust the first presentation time offset 170 based on the longer one mentioned above for the consistency of the presentation time offset in two directions. In some embodiments, the first device 110 may directly determine the longer one of the first initial duration 172 and the second initial duration 177 as the first adjusted duration 174. For example, it is assumed that the first initial duration 172 determined by the first device 110 is 150 microseconds and the second initial duration 177 received from the second device 120 is 147 microseconds, then the first device 110 may determine the longer one (i.e., 150 microseconds) of the first initial duration 172 and the second initial duration 177 as the first adjusted duration 174. As such, the adjustment of the first presentation time offset 170 by the first device 110 may be simplified to lower the processing overheads of the first device 110.

In other embodiments, the first device 110 may also determine the first adjusted duration 174 based on the longer one mentioned above in any other suitable ways. For example, the first device 110 may take the above longer one added with a predetermined increment as the first adjusted duration 174. Still referring to the above example, the first device 110 may add a predetermined increment of 1 microsecond to the larger number of 150 microseconds, to determine the first adjusted duration 174 as 151 microseconds. Accordingly, as the first adjusted duration 174 of the first presentation time offset 170 is set to a greater value, the transmission of the data from the first device 110 to the second device 120 via the protection path 125 is more reliable. It should be understood that the specific values of the various durations listed herein are examples only without suggesting any restrictions to the scope of the present disclosure. In other embodiments, the respective durations in the text may have any suitable values.

Similarly, after receiving (204) the first initial duration 162 of the first presentation time offset 160 from the first device 110, the second device 120 at the other side of the example communication process 200 may also determine (212) the second adjusted duration 169 of the second presentation time offset 165 based on the longer one of the first initial duration 162 and the second initial duration 167. In other words, the second device 120 may adjust the second presentation time offset 165 based on the longer one mentioned above for consistency of the presentation time offset in two directions. In some embodiments, the second device 120 may directly determine the longer one of the first initial duration 162 and the second initial duration 167 as the second adjusted duration 169. For example, it is assumed that the second initial duration 167 determined by the second device 120 is 102 microseconds and the first initial duration 162 received from the first device 110 is 100 microseconds, the second device 120 may determine the longer one (i.e., 102 microseconds) of the first initial duration 162 and the second initial duration 167 as the second adjusted duration 169. As such, the adjustment of the second presentation time offset 165 by the second device 120 may be simplified to lower the processing overheads of the second device 120.

In other embodiments, the second device 120 may also determine the second adjusted duration 169 based on the longer one mentioned above in any other suitable ways. For example, the second device 120 may take the longer one mentioned above added with a predetermined increment as the second adjusted duration 169. Still referring to the above example, the second device 120 may add a predetermined increment of 1 microsecond to the longer one of 102 microseconds, to determine the second adjusted duration 169 as 103 microseconds. Accordingly, as the second adjusted duration 169 of the second presentation time offset 165 is set to a greater value, the transmission of the data from the second device 120 to the first device 110 is more reliable. It should be appreciated that the specific values of the various durations are listed as examples only without suggesting any restrictions to the scope of the present disclosure. In other embodiments, the respective durations in the text may have any suitable values.

It should be noted that the above process in which the second device 120 determines the second adjusted duration 169 is for the working path 115. However, when the protection path 125 is present between the first device 110 and the second device 120, the second device 120 may determine (212) the second adjusted duration 179 of the second presentation time offset 175 for the protection path 125 in the same way. Specifically, the second device 120 may determine (212) the second adjusted duration 179 of the second presentation time offset 175 based on the longer one of the first initial duration 172 and the second initial duration 177. In other words, the second device 120 may adjust the second presentation time offset 175 based on the longer one mentioned above for the consistency of the presentation time offset in two directions. In some embodiments, the second device 120 may directly determine the longer one of the first initial duration 172 and the second initial duration 177 as the second adjusted duration 179. For example, it is assumed that the second initial duration 177 determined by the second device 120 is 147 microseconds and the first initial duration 172 received from the first device 110 is 150 microseconds, the second device 120 may determine the longer one (i.e., 150 microseconds) of the first initial duration 172 and the second initial duration 177 as the second adjusted duration 179. As such, the adjustment of the second presentation time offset 175 by the second device 120 may be simplified to lower the processing overheads of the second device 120.

In other embodiments, the second device 120 may also determine the second adjusted duration 179 based on the longer one mentioned above in any other suitable ways. For example, the second device 120 may take the longer one mentioned above added with a predetermined increment as the second adjusted duration 179. Still referring to the above example, the second device 120 may add a predetermined increment of 1 microsecond to the larger number of 150 microseconds, to determine the second adjusted duration 179 as 151 microseconds. Accordingly, as the second adjusted duration 179 of the second presentation time offset 175 is set to a greater value, the transmission of the data from the second device 120 to the first device 110 via the protection path 125 is more reliable. It should be appreciated that the specific values of the various durations are listed as examples only without suggesting any restrictions to the scope of the present disclosure. In other embodiments, the respective durations in the text may have any suitable values.

Continuing with the above example, the first device 110 may determine (210) the first adjusted duration 164 or the first adjusted duration 174 to be 102 microseconds (or added with the predetermined increment) or 150 microseconds (or added with the predetermined increment), and the second device 120 may determine (212) the second adjusted duration 169 or the second adjusted duration 179 to be 102 microseconds (or added with the predetermined increment) or 150 microseconds (or added with the predetermined increment). Accordingly, through the above example communication process 200, the first device 110 and the second device 120 may automatically align the first presentation time offset 160 (or the first presentation time offset 170) in the first direction from the first device 110 to the second device 120 with the second presentation time offset 165 (or second presentation time offset 175) in the second direction from the second device 120 to the first device 110 without interventions from the communication system or operators of the device. As a result, the level of automation of the first device 110 and the second device 120 in setting the first presentation time offset 160 (or the first presentation time offset 170) and the second presentation time offset 165 (or second presentation time offset 175) is enhanced.

Continuing to refer to FIG. 2, in some embodiments, the first device 110 and the second device 120 may further transmit the first adjusted duration 164 (or first adjusted duration 174) and the second adjusted duration 169 (or second adjusted duration 179) to each other, to confirm that the first presentation time offset 160 (or the first presentation time offset 170) and the second presentation time offset 165 (or second presentation time offset 175) have already been set to the same.

Specifically, as depicted in FIG. 2, the first device 110 may transmit (214) the first adjusted duration 164 of the first presentation time offset 160 to the second device 120, and the second device 120 may receive (216) the same from the first device 110. When the protection path 125 is present between the first device 110 and the second device 120, the first device 110 may also transmit (214) to the second device 120 the first adjusted duration 174 of the first presentation time offset 170. It should be noted that the first device 110 may transmit (214), to the second device 120, the first adjusted duration 164 for the working path 115 alone, or the first adjusted duration 174 for the protection path 125 alone, or both at the same time. At the other side of the example communication process 200, the second device 120 may correspondingly receive (216) either or both of the first adjusted duration 164 and the first adjustment 174 from the first device 110.

In some embodiments, the first device 110 may transmit (214) to the second device 120 the first adjusted duration 164, or the first adjusted duration 174 or both via a header of the RoE data packet (e.g., a few bits in the packet header). Accordingly, either or both of the first adjusted duration 164 and the first adjusted duration 174 may be carried incidentally in the packets that transmit other data or information, so as to save the transmission resources or signaling resources between the first device 110 and the second device 120. Alternatively or additionally, the first device 110 may also transmit (214) either or both of the first adjusted duration 164 and the first adjusted duration 174 to the second device 120 via a dedicated RoE control packet (e.g., a control packet 300). In this way, the transmission flexibility of the first adjusted duration 164 or the first adjusted duration 174 or both is improved without occupying the transmission resources or signaling resources for transmitting other data or information. More generally, the first device 110 may transmit (214) either or both of the first adjusted duration 164 and the first adjusted duration 174 to the second device 120 through any suitable messages, packets, signaling or similar forms.

Similarly, the second device 120 may transmit (218) the second adjusted duration 169 of the second presentation time offset 165 to the first device 110, and the first device 110 may receive (220) the same from the first device 110. When the protection path 125 is present between the first device 110 and the second device 120, the second device 120 may also transmit (218) the second adjusted duration 179 of the second presentation time offset 17 to the first device 1105. It should be noted that the second device 120 may transmit (218) to the first device 110 the second adjusted duration 169 for the working path 115 alone, or the second adjusted duration 179 for the protection path 125 alone, or both at the same time. At the other side of the example communication process 200, the first device 110 may correspondingly receive (220) from the second device 120 either or both of the second adjusted duration 169 and second adjusted duration 179.

In some embodiments, the second device 120 may transmit (218) to the first device 110 the second adjusted duration 169 or the second adjusted duration 179 or both via a header of the RoE data packet (e.g., a few bits in the packet header). Accordingly, either or both of the second adjusted duration 169 and the second adjusted duration 179 may be carried incidentally in the packets that transmit other data or information, so as to save the transmission resources or signaling resources between the first device 110 and the second device 120. Alternatively or additionally, the second device 120 also may transmit (218) either or both of the second adjusted duration 169 and the second adjusted duration 179 to the first device 110 via a dedicated RoE control packet (e.g., a control packet 300 in FIG. 3). As such, the transmission flexibility of the second adjusted duration 169 or the second adjusted duration 179 or both is enhanced without occupying the transmission resources or signaling resources for transmitting other data or information. More generally, the second device 120 may transmit (218) either or both of the second adjusted duration 169 and the second adjusted duration 179 to the first device 110 through any suitable message, packet, signaling or similar form.

Continuing to refer to FIG. 2, after receiving (220) the second adjusted duration 169 of the second presentation time offset 165 from the second device 120, the first device 110, if determining that the first adjusted duration 164 is equal to the second adjusted duration 169, may perform (222) the transmission of data from the first device 110 to the second device 120 via the working path 115 based on the first adjusted duration 164. For instance, continuing with the above example, the first device 110 may determine that both the first adjusted duration 164 and the second adjusted duration 169 are 102 microseconds (or added with a predetermined increment). Accordingly, the first device 110 may set the first adjusted duration 164 in its hardware to perform the data transmission from the first device 110 to the second device 120 via the working path 115.

In the case that the protection path 125 is present between the first device 110 and the second device 120, after receiving (220) from the second device 120 the second adjusted duration 179 of the second presentation time offset 175, the first device 110, if determining that the first adjusted duration 174 is equal to the second adjusted duration 179, may perform (222) the transmission of data from the first device 110 to the second device 120 via the protection path 125 based on the first adjusted duration 174. Continuing with the above example, the first device 110 may determine that both the first adjusted duration 174 and the second adjusted duration 179 are 150 microseconds (or added with a predetermined increment). Accordingly, the first device 110 may set the first adjusted duration 174 in its hardware to perform the data transmission from the first device 110 to the second device 120 via the protection path 125.

In other words, the hardware of the first device 110 may store two presentation time offsets for the working path 115 and the protection path 125, that is, the first presentation time offset 160 and the first presentation time offset 170. However, while communicating with the second device 120, the first device 110 may selectively use the presentation time offset for the active path to transfer data to the second device 120. As stated above, in the embodiments of the present disclosure, the active path may be the working path 115 or the protection path 125 depending on the decision of the path protection switching protocol.

In a similar fashion, after receiving (216) from the first device 110 the first adjusted duration 164 of the first presentation time offset 160, the second device 120, if determining that the second adjusted duration 169 is equal to the first adjusted duration 164, may perform (224) the transmission of data from the second device 120 to the first device 110 via the working path 115 based on the second adjusted duration 169. For instance, continuing with the above example, the second device 120 may determine both the second adjusted duration 169 and the first adjusted duration 164 to be 102 microseconds (or added with a predetermined increment). Accordingly, the second device 120 may set the second adjusted duration 169 in its hardware to perform the data transmission from the second device 120 to the first device 110 via the working path 115.

In the case that the protection path 125 is present between the first device 110 and the second device 120, after receiving (216) the first adjusted duration 174 of the first presentation time offset 170 from the first device 110, the second device 120, if determining that the second adjusted duration 179 is equal to the first adjusted duration 174, may perform (224) the transmission of data from the second device 120 to the first device 110 via the protection path 125 based on the second adjusted duration 179. Continuing with the above example, the second device 120 may determine that both the second adjusted duration 179 and the first adjusted duration 174 are 150 microseconds (or added with a predetermined increment). Accordingly, the second device 120 may set the second adjusted duration 179 in its hardware to perform the data transmission from the second device 120 to the first device 110 via the protection path 125.

In other words, the hardware of the second device 120 may store two presentation time offsets for the working path 115 and the protection path 125, that is, the second presentation time offset 165 and the second presentation time offset 175. However, while communicating with the first device 110, the second device 120 may selectively use the presentation time offset for the active path to transfer data to the first device 110. As indicated above, in the embodiments of the present disclosure, the active path may be the working path 115, and may also be the protection path 125, depending on the decision of the path protection switching protocol.

In the example communication process 200 of FIG. 2, the adjusted presentation time offset of the first device 110 and the second device 120 may probably exceed the two presentation time offsets exchanged therebetween. Therefore, in some embodiments, the first device 110 and the second device 120 may also transmit the adjusted presentation time offsets to each other to ensure that the presentation time offsets set by them for data transmission are the same. However, as mentioned above, in some embodiments, the first device 110 and the second device 120 may directly adjust their own presentation time offset to be the larger one of the two exchanged presentation time offsets. In these embodiments, the device having a small presentation time offset may straightforwardly complete the setting of the presentation time offset after adjusting the small presentation time offset to the large presentation time offset determined by the peer device, so as to simplify the setting process of the presentation time offset. Such example is described below with reference to FIG. 4.

Figure 4:
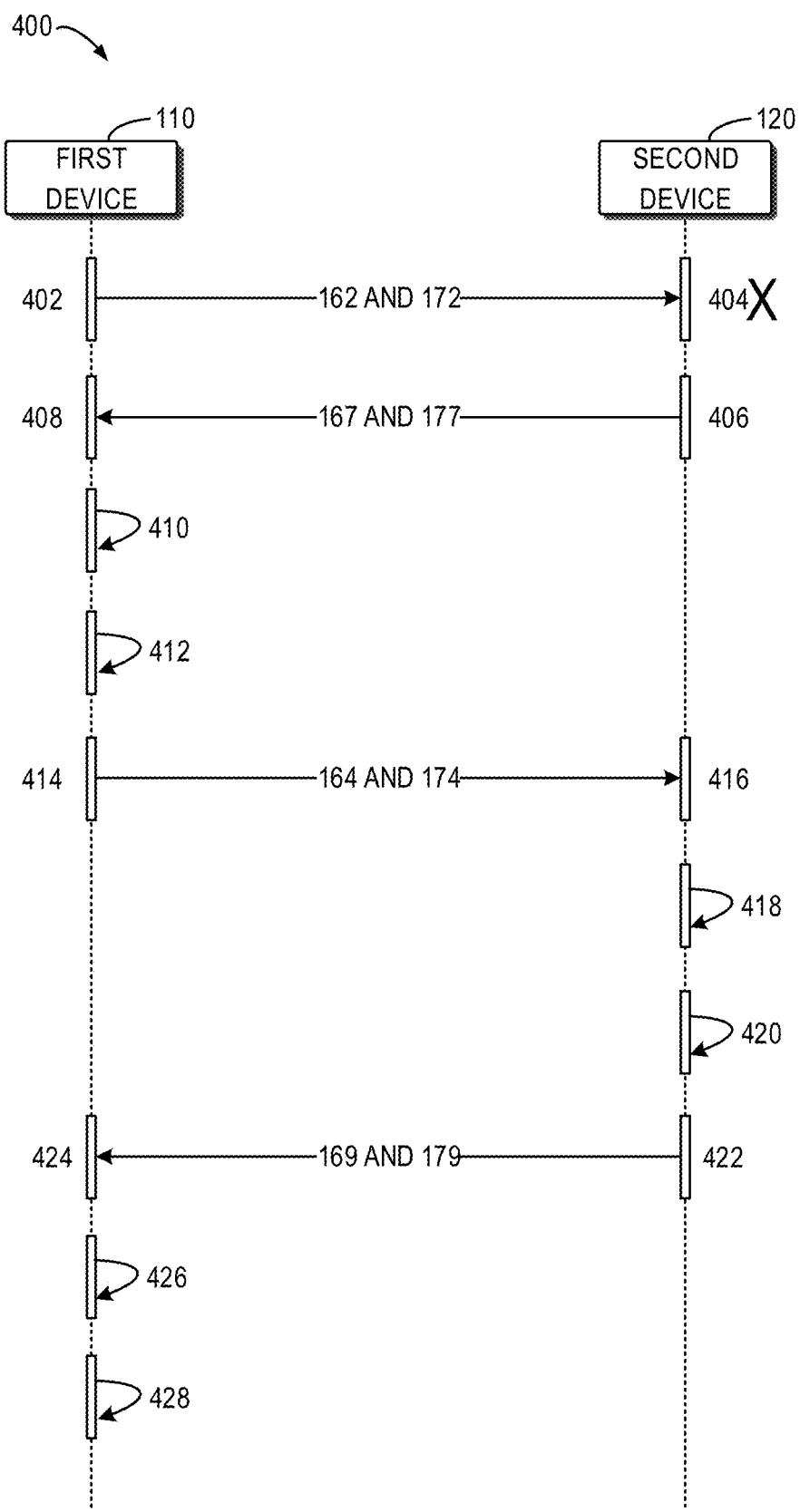
FIG. 4 illustrates a schematic diagram of a further example communication process between the first device and the second device in accordance with embodiments of the present disclosure.

FIG. 4 illustrates a schematic diagram of a further example communication process 400 between the first device 110 and the second device 120 in accordance with embodiments of the present disclosure. The example communication process 400 is to be described with reference to FIG. 1. However, it should be appreciated that the example communication process 400 is also equivalently applicable to any other suitable scenarios in which two or more communication devices or other devices communicate with each other. Unlike the example communication process 200 of FIG. 2, it is assumed that the first device 110 and the second device 120 transmit their own presentation time offset setting for the working path 115 and the protection path 125 simultaneously to each other in the example communication process 400.

As shown in FIG. 4, the first device 110 may transmit (402) the first initial duration 162 of the first presentation time offset 160 and the first initial duration 172 of the first presentation time offset 170 to the second device 120. In the example communication process 400, the first device 110 transmits (402) the first initial duration 162 and the first initial duration 172 in the ways similar to those in the example communication process 200 and the details will not be repeated here. Continuing with the above example, the first device 110 may transmit (402) the first initial duration 162 (100 microseconds) and the first initial duration 172 (150 microseconds) to the second device 120. Correspondingly, the second device 120 may receive (404) the first initial duration 162 of the first presentation time offset 160 and the first initial duration 172 of the first presentation time offset 170, such as 100 microseconds and 150 microseconds respectively from the first device 110.

In another aspect, the second device 120 may transmit (406) the second initial duration 167 of the second presentation time offset 165 and the second initial duration 177 of the second presentation time offset 175 to the first device 110. In the example communication process 400, the second device 120 transmits (406) the second initial duration 167 and the second initial duration 177 in the ways similar to those illustrated in the example communication process 200 and the details will not be repeated here. Continuing with the above example, the second device 120 may transmit (406) the second initial duration 167 (102 microseconds) and the second initial duration 177 (147 microseconds) to the first device 110. Correspondingly, the first device 110 may receive (408) the second initial duration 167 of the second presentation time offset 165 and the second initial duration 177 of the second presentation time offset 175, e.g., 102 microseconds and 147 microseconds from the second device 120.

After receiving (408) the second initial duration 167 associated with the working path 115 and the second initial duration 177 associated with the protection path 125, the first device 110 may determine (410) the first adjusted duration 164 of the first presentation time offset 160 and the first adjusted duration 174 of the first presentation time offset 170. Specifically, the first device 110 may determine (410) the first adjusted duration 164 as the longer one of the first initial duration 162 and the second initial duration 167, e.g., the longer one of 100 microseconds and 102 microseconds, and determine (410) the first adjusted duration 174 as the longer one of the first initial duration 172 and the second initial duration 177, e.g., the longer one of 150 microseconds and 147 microseconds.

Next, the first device 110 may determine that the first adjusted duration 164 of the first presentation time offset 160 is the same as the second initial duration 167 of the second presentation time offset 165 received from the second device 120, for example both are 102 microseconds. In other words, after the adjustment of the first presentation time offset 160, the first device 110 may determine that the adjusted first presentation time offset 160 is equal to the second presentation time offset 165 of the second device 120. In such case, the first device 110 may complete (412) the setting of the first presentation time offset 160. For example, the first device 110 may write the first adjusted duration 164 of the first presentation time offset 160 into its hardware for the subsequent transmission of data from the first device 110 to the second device 120 via the working path 115.

By contrast, the first device 110 may determine that the first adjusted duration 174 of the first presentation time offset 170 is different from the second initial duration 177 of the second presentation time offset 175 received from the second device 120. For example, they are 150 microseconds and 147 microseconds respectively. That is, after the adjustment of the first presentation time offset 170, the first device 110 may determine that the adjusted first presentation time offset 170 is not equal to the second presentation time offset 175. In this case, the first device 110 may continue the example communication 400 with the second device 120 to complete the subsequent setting of the first presentation time offset 170.

Subsequently, the first device 110 may transmit (414) the first adjusted duration 164 of the first presentation time offset 160 and the first adjusted duration 174 of the first presentation time offset 170, such as 102 microseconds and 150 microseconds to the second device 120. In the example communication process 400, the first device 110 transmits (414) the first adjusted duration 164 and the first adjusted duration 174 in the ways similar to those illustrated in the example communication process 200 and the details will not be repeated here. Correspondingly, the second device 120 may receive (416) from the first device 110 the first adjusted duration 164 and the first adjusted duration 174, e.g., 102 microseconds and 150 microseconds.

In the example communication process 400, it is assumed that the second device 120 fails to receive (404), from the first device 110, the first initial duration 162 of the first presentation time offset 160 and the first initial duration 172 of the first presentation time offset 170, or the reception of the first initial duration 162 and the first initial duration 172 is delayed due to some reasons (e.g., data loss). Accordingly, when (416) the first adjusted duration 164 and the first adjusted duration 174 is received from the first device 110, the second presentation time offset 165 is still the second initial duration 167 (e.g., 102 microseconds) and the second presentation time offset 175 is still the second initial duration 177 (e.g., 147 microseconds) at the second device 120.

In this case, the second device 120 may determine (418) the second adjusted duration 169 of the second presentation time offset 165 and the second adjusted duration 179 of the second presentation time offset 175. For example, the second device 120 may determine (418) the second adjusted duration 169 as the longer one of the first adjusted duration 164 and the second initial duration 167. For instance, if both of them are 102 microseconds, the larger one is also 102 microseconds. Moreover, the second device 120 may determine (418) the second adjusted duration 179 as the longer one of the first adjusted duration 174 and the second initial duration 177. For example, when they are 150 microseconds and 147 microseconds respectively, the longer one is 150 microseconds.

Then, the second device 120 may determine that the second adjusted duration 169 of the second presentation time offset 165 is equal to the first adjusted duration 164 of the first presentation time offset 160 received from the first device 110, for example, both are 102 microseconds. In other words, after the adjustment of the second presentation time offset 165, the second device 120 may determine that the adjusted second presentation time offset 165 is equal to the first presentation time offset 160 of the first device 110. In such case, the second device 120 may complete (420) the setting of the second presentation time offset 165. For example, the second device 120 may write the second adjusted duration 169 of the second presentation time offset 165 into its hardware for the subsequent transmission of data from the second device 120 to the first device 110 via the working path 115.

Similarly, the second device 120 may determine that the second adjusted duration 179 of the second presentation time offset 175 is equal to the first adjusted duration 174 of the first presentation time offset 170 received from the first device 110, e.g., both are 150 microseconds. In other words, after the adjustment of the second presentation time offset 175, the second device 120 may determine that the adjusted second presentation time offset 175 is equal to the first presentation time offset 170 of the first device 110. In such case, the second device 120 may complete (420) the setting of the second presentation time offset 175. For example, the second device 120 may write the second adjusted duration 179 of the second presentation time offset 175 into its hardware for the subsequent transmission of data from the second device 120 to the first device 110 via the protection path 125.

Although the second device 120 has completed (420) the setting of the second presentation time offset 165 and the second presentation time offset 175, the example communication process 400 may continue as the second presentation time offset 175 is updated, so as to cause the first device 110 to complete the setting of the first presentation time offset 170. Accordingly, the second device 120 may transmit (422) the second adjusted duration 169 of the second presentation time offset 165 and the second adjusted duration 179 of the second presentation time offset 175, e.g., 102 microseconds and 150 microseconds to the first device 110. In the example communication process 400, the second device 120 transmits (422) the second adjusted duration 169 and the second adjusted duration 179 in the ways similar to those illustrated in the example communication process 200 and the details will not be repeated here. Correspondingly, the first device 110 may receive (424) the second adjusted duration 169 and the second adjusted duration 179, for example, 102 microseconds and 150 microseconds from the second device 120. In some embodiments, the second device 120 may transmit (422) the second adjusted duration 179 of the second presentation time offset 175 to the first device 110, without transmitting the second adjusted duration 169.

After receiving (424) the second adjusted duration 169 associated with the working path 115 and the second adjusted duration 179 associated with the protection path 125, the first device 110, which has completed the setting of the first presentation time offset 160, may determine (426) a further adjusted duration of the first presentation time offset 170. For example, the first device 110 may determine the further adjusted duration as the longer one of the first adjusted duration 174 and the second adjusted duration 179. For example, if both of them are 150 microseconds, the longer one is 150 microseconds.

Afterwards, the first device 110 may determine that the further adjusted duration of the first presentation time offset 170 is equal to the second adjusted duration 179 of the second presentation time offset 175 received from the second device 120, for example, both of them are 150 microseconds. In other words, after the further adjustment of the first presentation time offset 170, the first device 110 may determine that the further adjusted first presentation time offset 170 is equal to the second presentation time offset 175 of the second device 120. In such case, the first device 110 may complete (428) the setting of the first presentation time offset 170. For example, the first device 110 may write the further adjusted duration of the first presentation time offset 170 into its hardware for the subsequent transmission of data from the first device 110 to the second device 120 via the protection path 125.

Alternatively, in some embodiments, after receiving (424) the second adjusted duration 169 associated with the working path 115 and the second adjusted duration 179 associated with the protection path 125, the first device 110 may directly determine that the first adjusted duration 174 is equal to the second adjusted duration 179 (e.g., both being 150 microseconds) and thus complete (428) the setting of the first presentation time offset 170. For example, the first device 110 may write the first adjusted duration 174 of the first presentation time offset 170 into its hardware for the subsequent transmission of data from the first device 110 to the second device 120 via the protection path 125. That is, in such embodiments, the first device 110 may not determine (426) the further adjusted duration of the first presentation time offset 170, which means that it is unnecessary to further adjust the first presentation time offset 170.

Accordingly, through the above example communication process 400, the first device 110 and the second device 120 may automatically align the first presentation time offset 160 (or the first presentation time offset 170) in the first direction from the first device 110 to the second device 120 with the second presentation time offset 165 (or second presentation time offset 175) in the second direction from the second device 120 to the first device 110, without intervention from the communication system or operators of the device. As a result, the level of automation of the first device 110 and the second device 120 in setting the first presentation time offset 160 (or the first presentation time offset 170) and the second presentation time offset 165 (or second presentation time offset 175) is enhanced. Additionally, compared with the example communication process 200, the setting process of the presentation time offset for the party having a small presentation time offset is simplified and can be completed quickly in the example communication process 400.

As mentioned in the above description of FIG. 2, prior to transmitting the first initial duration 162 of the first presentation time offset 160 to the second device 120, the first device 110 may determine the first initial duration 162 based on the end-to-end delay. As illustrated in FIG. 1, in the communication between the first device 110 and the second device 120, the design of the presentation time offset generally should take the total end-to-end delay between the time reference plane 180 at the side of the first device 110 and the time reference plane 190 at the side of the second device 120 into account. For example, the presentation time offsets in different directions determined by the first device 110 and the second device 120 may generally be considered to be equal to the total end-to-end delay in different directions between the reference plane 180 and the reference plane 190.

Usually, the total end-to-end delay between the first device 110 and the second device 120 may include network delay (i.e., transmission delay) of data in the network 150, processing delay of data in the first device 110 and the second device 120 and data buffer time and the like. For instance, the data buffer time may be set long enough to compensate the delay variations introduced by the network 150, the first device 110 and the second device 120, such that the total end-to-end delay (i.e., presentation time offset) may remain unchanged. For the purpose of illustration, the network delay of data in the network 150 and the processing delay of data in the first device 110 and the second device 120 are collectively known as network end-to-end delay, which is further indicated as end-to-end delay for short in the text. Therefore, the presentation time offset determined by the first device 110 and the second device 120 may be deemed as a sum of the end-to-end delay between the first device 110 and the second device 120 and the data buffer time.

It should be noted that the working path 115 and the protection path 125 between the first device 110 and the second device 120 are different communication links, so the transmission delays of the data over the working path 115 and the protection path 125 are also varied in general. That is, taking the first direction from the first device 110 to the second device 120 as an example, the first presentation time offset 160 associated with the working path 115 may include the end-to-end delay of the data on the working path 115 in the first direction and the data buffer time, while the first presentation time offset 170 associated with the protection path 125 may include the end-to-end delay of the data on the protection path 125 in the first direction and the data buffer time.

As a result, in some embodiments, in order to determine the first initial duration 162 of the first presentation time offset 160 associated with the working path 115, the first device 110 may determine the end-to-end delay associated with the working path 115 in the first place and then determine the first initial duration 162 of the first presentation time offset 160 based on the end-to-end delay of the working path 115. For example, the first device 110 may obtain the first initial duration 162 by adding sufficient data buffer time to the end-to-end delay of the working path 115. Similarly, in order to determine the first initial duration 172 of the first presentation time offset 170 associated with the protection path 125, the first device 110 may determine the end-to-end delay associated with the protection path 125 in the first place and then determine the first initial duration 172 of the first presentation time offset 170 based on the end-to-end delay of the protection path 125. For example, the first device 110 may obtain the first initial duration 172 by adding sufficient data buffer time to the end-to-end delay of the protection path 125. Examples are described below in detail with reference to FIGS. 5 and 6 as regards to the process of determining the first initial duration 162 of the first presentation time offset 160 and the first initial duration 172 of the first presentation time 170 by the first device 110.

Figure 5:
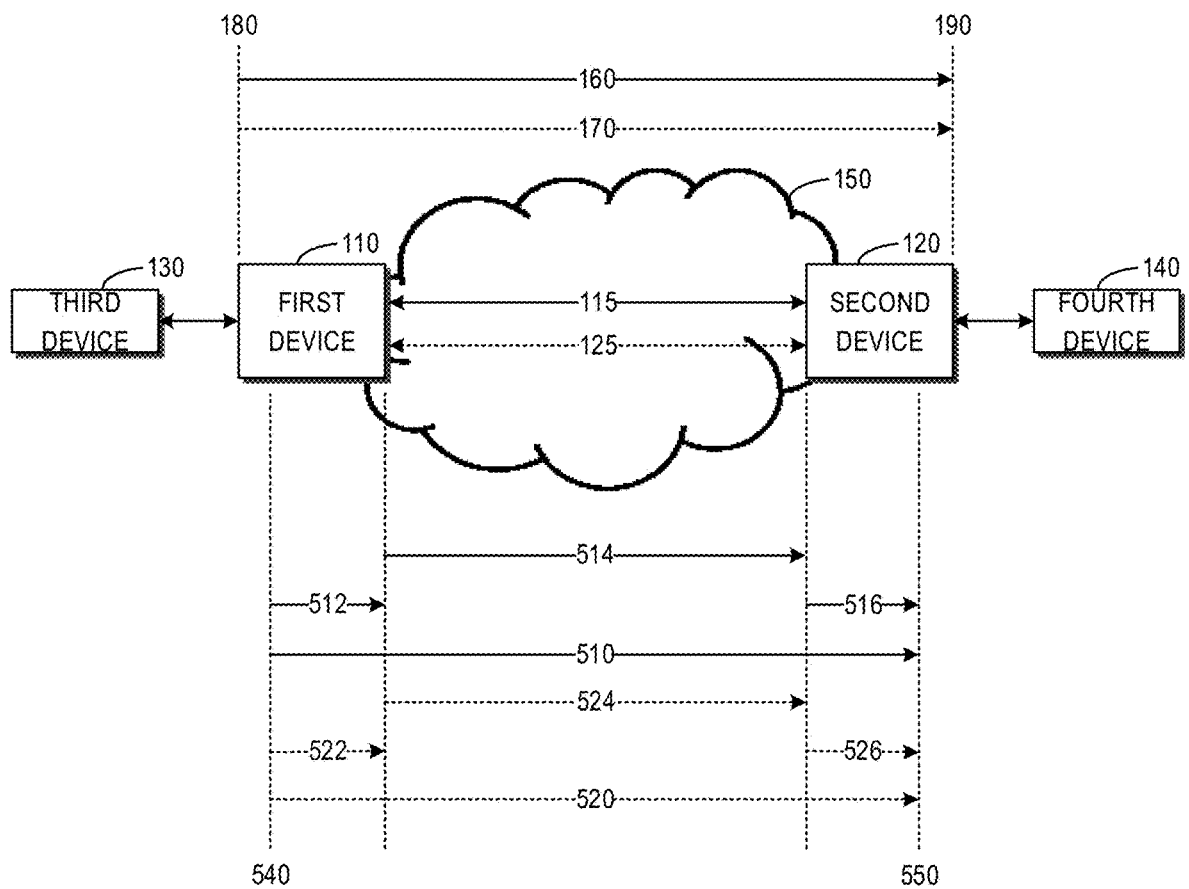
FIG. 5 illustrates a schematic diagram of the first end-to-end delay associated with the active path and the second end-to-end delay associated with the inactive path in accordance with embodiments of the present disclosure.

FIG. 5 illustrates a schematic diagram of a first end-to-end delay 510 associated with the active path 115 and a second end-to-end delay 520 associated with the inactive path 125 in accordance with embodiments of the present disclosure. In FIG. 5, the device or element identical to FIG. 1 is indicated with the same reference sign. It should be appreciated that both the working path 115 and the protection path 125 between the first device 110 and the second device 120 may act as the active path or the inactive path in the embodiments of the present disclosure. As illustrated below, the first device 110 may adopt different approaches to determine the end-to-end delay for the active and inactive paths. To clearly illustrate the difference between the active path and the inactive path, it is assumed without loss of generality that the working path 115 is the active path and the protection path 125 is the inactive path in the example of FIG. 5. It should also be noted that the example of FIG. 5 describes the determination of the first presentation time offset 160 and the first presentation time offset 170 by the first device 110, by taking the first direction from the first device 110 to the second device 120 as an example. It should be understood that the second device 120 may determine the second presentation time offset 165 and the second presentation time offset 175 in the second direction from the second device 120 to the first device 110 in similar ways.

Besides, in the example of FIG. 5, it is assumed that the data transmitted between the third device 130 and the fourth device 140 is in the first data form, e.g., CPRI protocol-based data, and the first data form cannot be directly transmitted via the network 150. As a result, in order to transmit the data in the first data form to the fourth device 140, the third device 130 may transmit the data to the first device 110. After receiving the data in the first data form from the third device 130, the first device 110 may generate, based on the data, the second data form that can be transmitted via the network 150 (e.g., Ethernet packets) at a time reference plane 540. Then, the first device 110 may transmit the data in the second data form to the second device 120 via the active path 115 in the network 150. Subsequently, the second device 120 may convert the data in the second data form into the first data form at a time reference plane 550 and transmit it to the fourth device 140.

During the above process, the first end-to-end delay 510 associated with the active path 115 in the first direction from the first device 110 to the second device 120 may be defined as the delay of the reference plane 550 with respect to the reference plane 540, related to the active path 115. For example, the first end-to-end delay 510 may include the first data processing delay 512 associated with the active path 115 within the first device 110, the first data transmission delay 514 associated with the active path 115 and the second data processing delay 516 associated with the active path 115 within the second device 120. In addition, although the first device 110 and the second device 120 are not currently communicating via the inactive path 125, the second end-to-end delay 520 associated with the inactive path 125 in the first direction from the first device 110 to the second device 120 may be similarly defined as the delay of the reference plane 550 with respect to the reference plane 540, related to the inactive path 125. For example, the second end-to-end delay 520 may include the third data processing delay 522 associated with the inactive path 125 within the first device 110, the second data transmission delay 524 associated with the inactive path 125 and the fourth data processing delay 526 associated with the inactive path 125 within the second device 120.

Although the first end-to-end delay 510 includes the first data processing delay 512, the first data transmission delay 514 and the second data processing delay 516, it does not mean that the above delays should be respectively determined for the determination of the first end-to-end delay 510. In some embodiments, as the first device 110 and the second device 120 are currently communicating via the working path 115, the first end-to-end delay 510 associated with the active path 115 may be directly measured. For example, the first end-to-end delay 510 may be measured by disposing delay measurement tools within the first device 110 and the second device 120. To be specific, the delay measurement tool may detect a latency from the time the data in the second data form is generated in the first device 110 to the time it is converted in the second device 120. In another example, the first device 110 may mark a transmission timestamp in the data transmitted to the second device 120 and then transmit the data via the active path 115 to the second device 120. Upon receiving the data, the second device 120 may mark a reception timestamp in the data. The first end-to-end delay 510 is a time difference between the transmission timestamp and the reception timestamp. For a further example, the first device 110 may directly generate a management frame for measuring the first end-to-end delay 510 and then transmit to the second device 120. The first device 110 and the second device 120 may measure the first end-to-end delay 510 by setting the transmission timestamp and the reception timestamp in the management frame.

Subsequent to determining the first end-to-end delay 510 associated with the active path 115, the first device 110 may determine, based on the first end-to-end delay 510, the first initial duration 162 of the first presentation time offset 160 associated with the active path 115. For example, due to the possible delay jitter or delay variation of the first end-to-end delay 510, the first device 110 may obtain the first initial duration 162 of the first presentation time offset 160 by adding the data buffer time to the first end-to-end delay 510. Therefore, the unstable delay jitter or delay variation is removed from the first end-to-end delay 510 and the data may be output from the second device 120 according to a fixed presentation time offset. In this way, the first device 110 may reasonably determine the first initial duration 162 of the first presentation time offset 160 to balance the decrease of the first presentation time offset 160 with the improvement in data transmission reliability.

Unlike the first end-to-end delay 510 associated with the active path 115, the second end-to-end delay 520 associated with the inactive path 125 may not be directly measured. Because the first device 110 and the second device 120 are currently not communicating via the inactive path 125, it is impossible to transmit the data or management frame for measuring the second end-to-end delay 520 via the inactive path 125. Additionally, since the first device 110 and the second device 120 do not communicate via the inactive path 125, the management frame for measuring delays cannot be transmitted from the inside of the first device 110 to the inactive path 125 or from the inactive path 125 to the inside of the second device 120. Accordingly, the third data processing delay 522 and the fourth data processing delay 526 in the second end-to-end delay 520 could not be measured either. In some embodiments, however, the second data transmission delay 524 in the second end-to-end delay 520 may be measured. For example, the management frame for measuring the second data transmission delay 524 may be transmitted between a port of the first device 110 connected to the inactive path 125 and a port of the second device 120 connected to the inactive path 125.

In a further aspect, the first end-to-end delay 510 and the first data transmission delay 514 on the active path 115 are measurable. Therefore, in some embodiments, the first device 110 and the second device 120 may configure the transmission parameters associated with the active path 115 and the inactive path 125, such that the first data processing delay 512 is approximately equal to the third data processing delay 522, and the second data processing delay 516 is approximate equal to the fourth data processing delay 526. Quantitatively, the first device 110 and the second device 120 may be configured such that the difference between the first data processing delay 512 and the third data processing delay 522 is below a predetermined threshold and the difference between the second data processing delay 516 and the fourth data processing delay 526 is also below a predetermined threshold.

In some embodiments, the above configuration may include that the active path 115 and the inactive path 125 are connected to the same hardware in the first device 110, have the same software setting and the same data rate and the like, and that the active path 115 and the inactive path 125 are connected to the same hardware in the second device 120, have the same software setting and the same data rate and the like. In other embodiments, the above configuration may be controlled by the operator of the first device 110 and the second device 120 through using the same configurations for the active path 115 and the inactive path 125. For example, the port of the first device 110 (or the second device 120) for connecting the working path 115 and the port of the first device 110 for connecting the protection path 125 may be configured by their common Ethernet switch to operate at the same rate, such that the common traffic on the working path 115 or the protection path 125 may cause similar delays etc.

Under such a configuration, the first data processing delay 512 is approximately equal to the third data processing delay 522, and the second data processing delay 516 is approximately equal to the fourth data processing delay 526. Thus, the first device 110 may estimate the second end-to-end delay 520 associated with the inactive path 125 according to the first end-to-end delay 510 associated with the active path 115 and an acceptable accuracy of such estimation may be guaranteed. Specifically, the first device 110 may substitute the first data transmission delay 514 in the first end-to-end delay 510 with the second data transmission delay 524, to obtain the estimated second end-to-end delay 520. The following text describes that the first device 110 estimates the second end-to-end delay 520 based on the first end-to-end delay 510 and then determines the first initial duration 172 associated with the inactive path 125 based on the estimated second end-to-end delay 520 with reference to FIG. 6.

Figure 6:
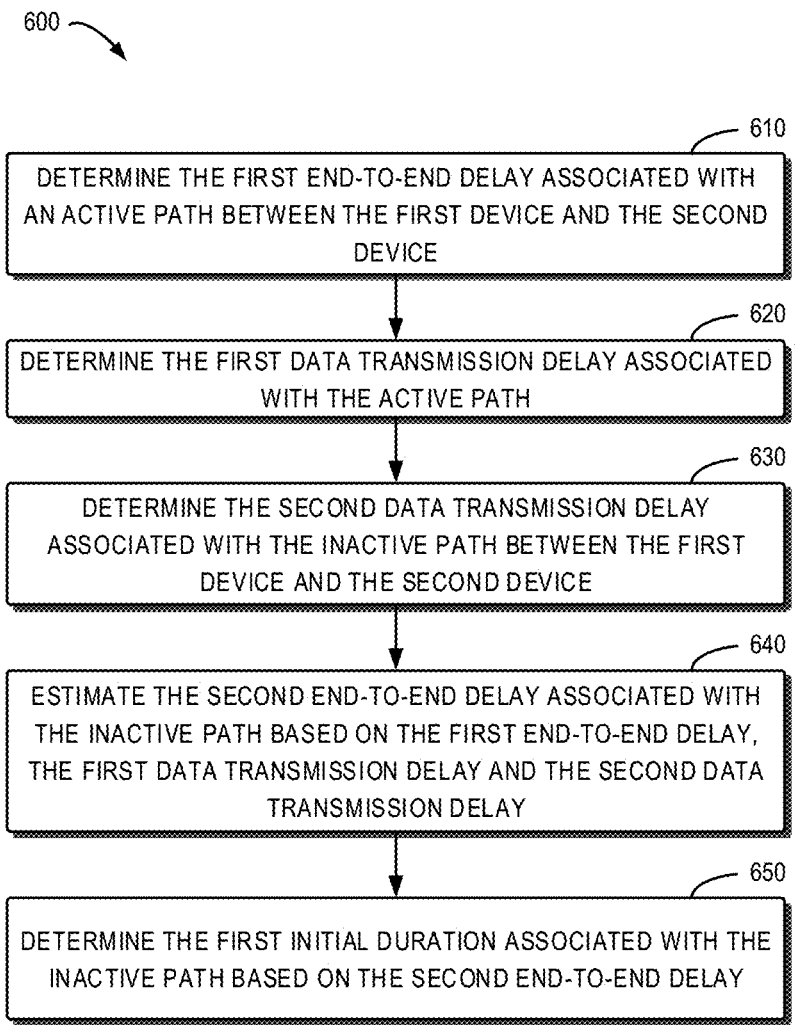
FIG. 6 illustrates a flowchart of an example process for determining the first initial duration of the first presentation time offset associated with the inactive path in accordance with embodiments of the present disclosure.

FIG. 6 illustrates a flowchart of an example process 600 for determining the first initial duration 172 of the first presentation time offset 170 associated with the inactive path 125 in accordance with embodiments of the present disclosure. In some embodiments, the example process 600 may be implemented by the first device 110 in the example communication system 100, for example, a processor or processing unit of the first device 110. In other embodiments, the example process 600 may also be implemented by other communication devices in/independent of the example communication system 100. For the purpose of illustration, the example process 600 is described with reference to FIG. 5.

At block 610, the first device 110 may determine the first end-to-end delay 510 associated with the active path 115 between the first device 110 and the second device 120. As mentioned above, in some embodiments, the first end-to-end delay 510 of the active path 115 may be measured directly. To be specific, when the first device 110 transmits data to the second device 120 via the active path 115, the first device 110 may record a timestamp when the data is converted from the first data form to the second data form within the first device 110 (i.e., a timestamp of the reference plane 540) and the second device 120 may record a timestamp when the data is converted from the second data form back to the first data form within the second device 120 (i.e., a timestamp of the reference plane 550). Additionally or alternatively, the first device 110 may directly generate a management frame within its own and transmit it to the second device 120 via the active path 115. Accordingly, the first device 110 may record a timestamp when the management frame is generated within the first device 110 (i.e., a timestamp of the reference plane 540) while the second device 120 may record a timestamp when the processing of the management frame is completed within the second device 120 (i.e., a timestamp of the reference plane 550). The first device 110 may determine the first end-to-end delay 520 of the active path 115 based on the above two timestamps despite of whether it is using the data or management frame.

At block 620, the first device 110 may determine the first data transmission delay 514 associated with the active path 115. As described above, in some embodiments, the first data transmission delay 514 of the active path 115 may also be directly measured. To be specific, when the first device 110 is transmitting data to the second device 120 via the active path 115, the first device 110 may record a timestamp indicating the start of the transmission of the data in the second data form to the active path 115 via the network port of the first device 110 (not shown in FIG. 5) and the second device 120 may record a timestamp indicating the completion of the transmission of the data in the second data form from the active path 115 via the network port of the second device 120 (not shown in FIG. 5). Additionally or alternatively, the first device 110 may directly generate a management frame within its own and transmit it to the second device 120 via the active path 115. Accordingly, the first device 110 may record a timestamp indicating the start of the transmission of the management frame to the active path 115 via the network port of the first device 110 while the second device 120 may record a timestamp indicating the completion of the transmission of the management frame from the active path 115 via the network port of the second device 120. The first device 110 may determine the first data transmission delay 514 associated with the active path 115 based on the above two timestamps despite of whether it is using the data or management frame.

At block 630, the first device 110 may determine the second data transmission delay 524 associated with the inactive path 125. As mentioned above, although the end-to-end delay 520 of the inactive path 125 cannot be measured directly, the second data transmission delay 524 associated with the inactive path 125 may be measured straightforwardly in some embodiments. Specifically, the first device 110 may directly generate a management frame within its own and transmit it to the second device 120 via the inactive path 125. As such, the first device 110 may record a timestamp indicating the start of the transmission of the management frame to the inactive path 125 via the network port of the first device 110 (not shown in FIG. 5) while the second device 120 may record a timestamp indicating the completion of the transmission of the management frame from the inactive path 125 via the network port of the second device 120 (not shown in FIG. 5). The first device 110 may determine, based on the above two timestamps, the second data transmission delay 524 associated with the inactive path 125.

At block 640, the first device 110 may estimate the second end-to-end delay 520 associated with the inactive path 125 based on the first end-to-end delay 510, the first data transmission delay 514 and the second data transmission delay 524. For example, in some embodiments, the first data processing delay 512 associated with the active path 115 is considered basically equal to the third data processing delay 522 associated with the inactive path 125, and the second data processing delay 516 associated with the active path 115 is also regarded substantially equal to the fourth data processing delay 526 associated with the inactive path 125. In such case, the first device 110 may estimate the second end-to-end delay 520 by subtracting the first data transmission delay 514 from the first end-to-end delay 510 and then adding the second data transmission delay 524.

In other embodiments, the difference between the first data processing delay 512 and the third data processing delay 522 may be estimated based on historical statistical data, and the difference between the second data processing delay 516 and the fourth data processing delay 526 may also be estimated based on historical statistical data. Under such circumstances, the first device 110 may add the second data transmission delay 524 after subtracting the first data transmission delay 514 from the first end-to-end delay 510 and then adjust the result with the above two differences, to estimate the second end-to-end delay 520. In further embodiments, the first device 110 may also estimate the second end-to-end delay 520 in any other suitable ways.

Accordingly, the first device 110 may estimate the second end-to-end delay 520 on the inactive path 125 based on the first end-to-end delay 510 on the active path 115 in the example process 600. It should be noted that the second end-to-end delay 520 may cover the internal processing delays of the first device 110 and the second device 120, for example, processing delays of the packet switching components and Medium Access Control (MAC) functionality in the first device 110 and the second device 120 and the like. In contrast, the conventional delay measurement scheme (e.g., RoE delay measurement DM of the IEEE P1914.3a Standard) fails to involve the processing delays within the device. Besides, the conventional delay measurement scheme (e.g., "UP" MEP in the ITU-T Y.1731 DM Standard) also fails to measure the delays over the inactive path.

At block 650, after estimating the second end-to-end delay 520, based on the second end-to-end delay 520, the first device 110 may determine the first initial duration 172 of the first presentation time offset 170 associated with the inactive path 125. For example, due to the possible delay jitter or delay variation of the second end-to-end delay 520, the first device 110 may obtain the first initial duration 172 of the first presentation time offset 170 by adding the data buffer time to the second end-to-end delay 520, such that the unstable delay jitter or delay variation is removed from the second end-to-end delay 520 and the data may be output from the second device 120 according to a fixed presentation time offset. In this way, the first device 110 may reasonably determine the first initial duration 172 of the first presentation time offset 170 to balance the decrease of the first presentation time offset 170 with the improvement in data transmission reliability.

The conventional solution switches the protection path 125 to be the active path and then measures the time cost by the second end-to-end delay 520. By contrast, the time spent on estimating or determining the second end-to-end delay 520 on the inactive path 125 with sufficient accuracy is significantly reduced in the example process 600. Besides, with the aid of the example process 600, the first device 110 may obtain the second end-to-end delay 520 on the inactive path 125 before the communication is switched to the protection path 125. As a result, the time for recovering the data transmission (e.g., RoE service) after the switchover may be greatly reduced. Currently, the target recovery time is about several hundred milliseconds and is required to be below 1 second. However, it takes several seconds to obtain a stable delay measurement result on the protection path 125 after the switchover and this clearly cannot satisfy the above requirement. In comparison, through the example process 600 the recovery time is shortened to less than one second to meet the above requirement. Additionally, the first device 110 may regularly estimate the end-to-end delay on the inactive path to constantly maintain the end-to-end delay on the inactive path. Therefore, during the protection switching, the first device 110 may recalculate the presentation time offset based on the maintained end-to-end delay and immediately reset the presentation time offset without restarting the delay measurement process and waiting for the measurement result.

Figure 7:
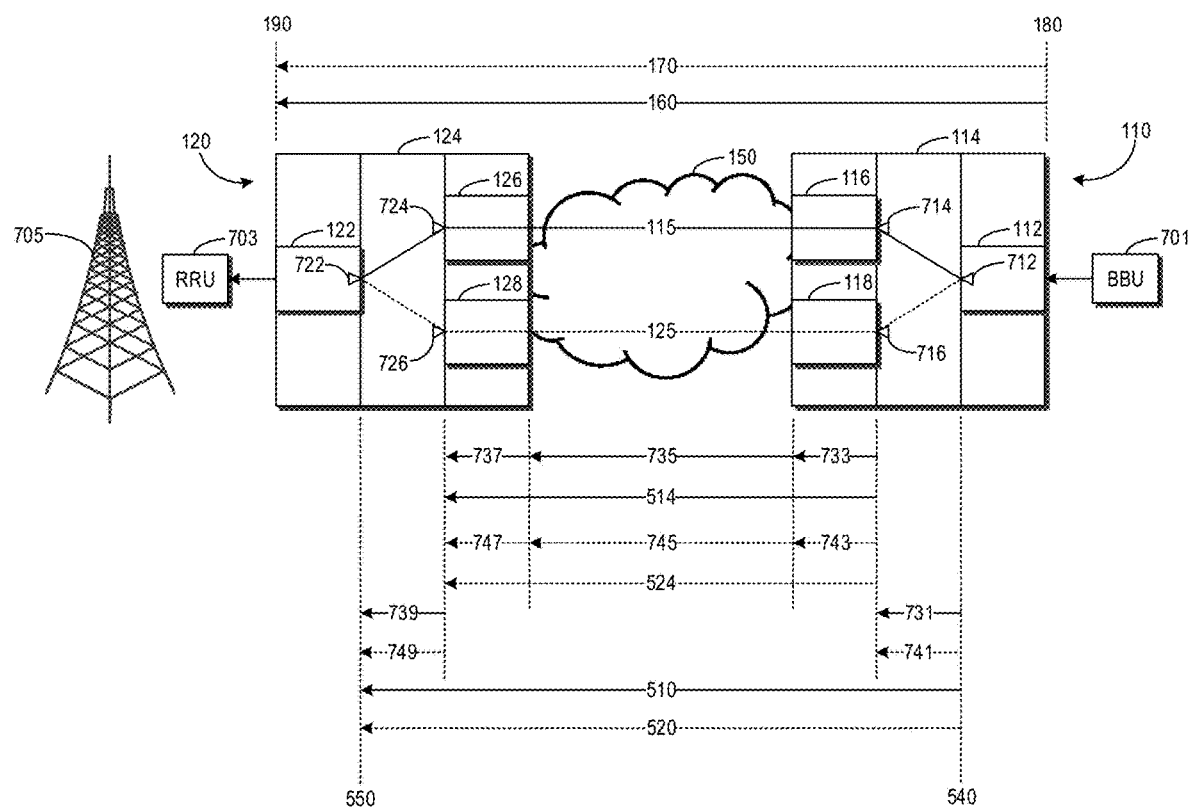
FIG. 7 illustrates examples of the embodiments of the present disclosure based on RoE protocol.

FIG. 7 illustrates RoE protocol-based examples of the embodiments of the present disclosure. In FIG. 7, the device or element identical to FIGS. 1 and 5 is indicated with the same reference sign. In the RoE protocol-based example of FIG. 7, the network 150 may be Ethernet, and the active path 115 and the inactive path 125 accordingly may be two different Ethernet links. Besides, a Baseband Processing Unit (BBU) 701, which is an example of the third device 130 depicted in FIGS. 1 and 5, may be connected to the first device 110. A Remote Radio Unit (RRU) 703, which is an example of the fourth device 140 depicted in FIGS. 1 and 5, may be connected to the second device 120. As shown in FIG. 7, the remote radio unit 703 may be disposed at a wireless signal transceiver 705.

It should be noted that both the working path 115 and the protection path 125 between the first device 110 and the second device 120 may act as the active path or the inactive path in the embodiments of the present disclosure. For the purpose of illustration, it is assumed without loss of generality that the working path 115 is the active path and the protection path 125 is the inactive path in the example of FIG. 7. It should be understood that, in the example of FIG. 7, the various delays associated with the active path 115 and the inactive path 125 between the first device 110 and the second device 120 are described by taking the first direction from the first device 110 to the second device 120 as an example. It should be appreciated that the various delays associated with the active path 115 and the inactive path 125 between the first device 110 and the second device 120 in the second direction from the second device 120 to the first device 110 may be similar.

In the example of FIG. 7, the first device 110 may include the first packet processing component 112, the first packet switching component 114, the first Ethernet port 116 and the third Ethernet port 118. The second device 120 may include the second packet processing component 122, the second packet switching component 124, the second Ethernet port 126 and the fourth Ethernet port 128. As depicted in FIG. 7, the first Ethernet port 116 of the first device 110 and the second Ethernet port 126 of the second device 120 are connected to the active path 115, while the third Ethernet port 118 of the first device 110 and the fourth Ethernet port 128 of the second device 120 are connected to the inactive path 125. In some embodiments, the first packet processing component 112 and the first packet switching component 114 in the first device 110 may include an RoE mapper and an Ethernet switch respectively, and the first Ethernet port 116 and the third Ethernet port 118 in the first device 110 may be physical ports for Ethernet transmission. By analogy, the second packet processing component 122 and the second packet switching component 124 in the second device 120 may include an RoE de-mapper and an Ethernet switch respectively, and the second Ethernet port 126 and the fourth Ethernet port 128 in the second device 120 may be physical ports for Ethernet reception.

In the course of transmitting data (e.g., CPRI protocol-based data) from the baseband processing unit 701 to the remote radio unit 703, the baseband processing unit 701 may input the data to the first device 110. The first packet processing component 112 of the first device 110 may then receive the data input by the baseband processing unit 130 and generate packets based on the input data. For example, the first packet processing component 112 may include a CPRI protocol based-physical layer device for receiving CPRI protocol data and an RoE mapper that forms the packets based on the data. Next, at the time reference plane 540, the first packet processing component 112 of the first device 110 may provide the generated packets to the first packet switching component 114, while the first packet switching component 114 may forward the packets to the first Ethernet port 116. The first Ethernet port 116 may subsequently transmit the packets to the active path 115 and transmit to the second Ethernet port 126 of the second device 120.

At the time reference plane 550, the second packet switching component 124 of the second device 120 may forward the packets from the second Ethernet port 126 to the second packet processing component 122. Then, the second packet processing component 122 may extract data from the packets and transmit the extracted data to the remote radio unit 703. For example, the second packet processing component 122 may include the RoE de-mapper that obtains the data from the packets based on the CPRI protocol and the physical layer device for transmitting the CPRI protocol data. It should be noted that the remote radio unit 703 may also transmit data to the baseband processing unit 701 in the example of FIG. 7. The detailed data transmission process is symmetrical to the above described data transmission process from the baseband processing unit 701 to the remote radio unit 703 and will not be repeated here.

According to the above data transmission process, the first end-to-end delay 510 from the first device 110 to the second device 120 via the active path 115 may be a sum of a plurality of delays in the example of FIG. 7. For example, the delays may include a data switching delay 731 of the first Ethernet switching component 114 of the first device 110 associated with the active path 115, a data transmission delay 733 over the first Ethernet port 116 of the first device 110 connected to the active path 115, a data transmission delay 735 on the active path 115, a data transmission delay 737 over the second Ethernet port 126 of the second device 120 connected to the active path 115, and a data switching delay 739 of the second Ethernet switching component 124 of the second device 120 associated with the active path 115.

Similarly, the second end-to-end delay 520 from the first device 110 to the second device 120 via the inactive path 125 may be a sum of a plurality of delays. For example, the delays may include a data switching delay 741 of the first Ethernet switching component 114 of the first device 110 associated with the inactive path 125, a data transmission delay 743 over the third Ethernet port 118 of the first device 110 connected to the inactive path 125, a data transmission delay 745 over the inactive path 125, a data transmission delay 747 over the fourth Ethernet port 128 of the second device 120 connected to the inactive path 125, and a data switching delay 749 of the second Ethernet switching component 124 of the second device 120 associated with the inactive path 125.

Besides, the first data transmission delay 514 from the first device 110 to the second device 120 via the active path 115 may be a sum of a plurality of delays. For example, the delays may include a data transmission delay 733, a data transmission delay 735 and a data transmission delay 737. Additionally, the first data processing delay 512 within the first device 110 associated with the active path 115 as depicted in FIG. 5 may include the data switching delay 731, indicating the delay experienced when the first Ethernet switching component 114 forwards a packet to the first Ethernet port 116. The second data processing delay 516 within the second device 120 associated with the active path 115 depicted in FIG. 5 may include the data switching delay 739, representing the delay generated when the second Ethernet switching component 124 forwards a packet from the second Ethernet port 126 to the second packet processing component 122.

Moreover, the second data transmission delay 524 from the first device 110 to the second device 120 via the inactive path 125 may be a sum of a plurality of delays. For example, the delays may include data transmission delay 743, data transmission delay 745 and data transmission delay 747. Additionally, the third data processing delay 522 within the first device 110 associated with the inactive path 125 as depicted in FIG. 5 may include the data switching delay 741, indicating the delay experienced when the first Ethernet switching component 114 forwards a packet to the third Ethernet port 118. The fourth data processing delay 526 within the second device 120 associated with the inactive path 125 depicted in FIG. 5 may include the data switching delay 749, representing the delay generated when the second Ethernet switching component 124 forwards a packet from the fourth Ethernet port 128 to the second packet processing component 122. In accordance with the above definitions of the various delays, the first device 110 can understand where the respective delays are measured or where the measuring points for delay measurements are disposed.

As mentioned in the description of FIG. 5, in some embodiments, the end-to-end delay 520 of the inactive path 125 between the first device 110 and the second device 120 cannot be measured directly. Further explanation is provided below with reference to the example depicted in FIG. 7. In the example of FIG. 7, Operation, Administration and Maintenance (OAM) Delay Measurement (DM) tools and 1DM (One-way Delay Measurement) tools in the International Telecommunication Union ITU-T Y.1731 may be used to measure one-way delay between two Maintenance End Points (MEPs). For example, the two MEPs may correspond to two delay measurement points disposed in the first device 110 and the second device 120, respectively. However, when the "UP" MEP is created on the first device 110 (e.g., the RoE transmitter) and the second device 120 (e.g., the RoE receiver) to measure the delay therebetween, the "UP" MEP can only measure the delay on the active path 115 instead of the delay on the inactive path 125 because the inactive path 125 is blocked for the "UP" MEP traffic.

Specifically, the delays which can be measured by the "UP" MEP are further elaborated with reference to FIG. 7. According to FIG. 7, when the delay measurement is performed using ITU-T Y.1731 Standard, a measuring point 712 may be disposed at the input side (i.e., reference plane 540) of the first packet switching component 114 in the first device 110 and a measuring point 722 may be arranged at the output side (i.e., reference plane 550) of the second packet switching component 124 in the second device 120. Both the measuring point 712 and the measuring point 722 may may the "UP" MEP. The OAM DM packet transmitted from the measuring point 712 to the measuring point 722 via the active path 115 may measure the end-to-end delay 510 on the active path 115. However, when the Ethernet ports of the first device 110 and the second device 120 are configured with the protection path 125 (e.g., linear protection or ring protection), the "UP" MEP can only measure the latency on the active path 115 because the inactive path 125 is blocked for the OAM packet from the "UP" MEP.

Additionally, in the example of FIG. 7, a "DOWN" MEP may be created at the Ethernet ports of the first device 110 and the second device 120 based on the ITU-T Y.1731 Standard to measure the delay between the "DOWN" MEP at both ends. For example, the "DOWN" MEP may simultaneously measure the delays on the working path 115 between the two end Ethernet ports of the first device 110 and the second device 120 and the delays on the protection path between the two end Ethernet ports, but cannot cover the delay between the RoE mapper or de-mapper and the Ethernet ports in a single node.

To be specific, the delays which can be measured by the "DOWN" MEP are further elaborated with reference to FIG. 7. As shown in FIG. 7, in some embodiments, the measuring points 714 and 716 respectively disposed at the inner side of the first Ethernet port 116 and of the third Ethernet port 118 in the first device 110 may be "DOWN" MEP, and the measuring points 724 and 726 arranged at the inner side of the second Ethernet port 126 and of the fourth Ethernet port 128 in the second device 120 may also be the "DOWN" MEP. When the Ethernet ports of the first device 110 and the second device 120 are provided with the protection path 125 (e.g., linear protection or ring protection), the first device 110 and the second device 120 may configure the "DOWN" MEP on the working path 115 and the protection path 125 simultaneously. The measuring points 714 and 724 on the working path 115 may measure the delays (i.e., the first data transmission delay 514) via the first Ethernet port 116 of the first device 110, the Ethernet 150 and the second Ethernet port 126 of the second device 120 on the working path 115. The measuring points 716 and 726 on the protection path 125 may measure the delay (i.e., second data transmission delay 524) via the third Ethernet port 118 of the first device 110, the Ethernet 150 and the fourth Ethernet port 128 of the second device 120 on the protection path 125. However, the delays measured by the "DOWN" MEP is unable to cover the delays of the Ethernet switching components and the Ethernet MAC ports in the first device 110 and the second device 120.

In addition to the above described limitations on the measurement performed by the "UP" MEP and the "DOWN" MEP, it should also be noted that the "UP" MEP and the "DOWN" MEP measure the delay from the time when the first bit of the packet (e.g., DM packet) for measuring delay is transmitted to the time when the last bit of the packet is received. However, the presentation time offset is calculated according to the delay from the time when the first bit of the data (packet or frame) is transmitted to the time when the first bit is received. Accordingly, when the various delays in the embodiments of the present disclosure are measured based on the ITU-T Y.1731 Standard, the definitions of delay and the measurements in the standard may be adjusted and further determined for a predetermined bit in a data packet. In other words, the various delays described herein, for example, the first end-to-end delay 510, the first data transmission delay 514, the second data transmission delay 524, the second end-to-end delay 520 and the like, are determined for a predetermined bit in a data packet.

For example, in some embodiments, the predetermined bit may be the first bit or the last bit as they can be located easily. It is certain that the predetermined bit may also be any bit in the packet in other embodiments. Based on the above definition, the first device 110 may make adjustments according to the definition of the presentation time offset in the RoE standard and measure the various delays in the embodiments of the present disclosure using the delay measurement methods defined in the ITU-T Y.1731 protocol, thereby improving the efficiency of measuring the various delays provided for the determination of the presentation time offset. Furthermore, besides the ITU-T Y.1731 described above, the RoE DM mechanism in IEEE protocol P1914.3a may also be applied to measure the delay between two end Ethernet ports on the working path 115 or the protection path 125, but it cannot cover the delay between the RoE mapper or de-mapper and the Ethernet ports in the single node (i.e., the first device 110 or second device 120), like the DM or 1DM tools in the ITU-T Y.1731.

That is to say, in the example of FIG. 7, the end-to-end delay 520 of the inactive path 125 cannot be measured with conventional delay measurement tools. However, when the first device 110 and the second device 120 are communicating via the active path 115, it would be beneficial if the second end-to-end delay 520 of the inactive path 125 is also able to be determined. For example, in FIG. 7, the first device 110 and the second device 120 are deployed in a fronthaul transport network including the baseband processing unit 701 and the remote radio unit 703. The fronthaul transport nodes (i.e., the baseband processing unit 701 and the remote radio unit 703) may connect the RoE mapper or de-mapper to the Ethernet port through the Ethernet switch, and all of these components may be included in a single node (i.e., the first device 110 or second device 120). Additionally, the Ethernet port of the first device 110 or the second device 120 is connected to the Ethernet 150 and the protection path 125 is also present between the first device 110 and the second device 120. In order to recover the communication as fast as possible after the protection switchover between the working path 115 and the protection path 125, the first device 110 and the second device 120 may be required to reset the presentation time offset in the fastest way according to the end-to-end delay of the newly activated path.

Accordingly, for the purpose of enhancing the automation of the communication, the first device 110 and the second device 120 may need to determine the end-to-end delay of the newly activated path as fast as possible to reduce the interrupt time of the communication traffic. As a result, in the embodiments of the present disclosure, the first device 110 may obtain the second end-to-end delay 520 of the inactive path 125 between the first device 110 and the second device 120 prior to the switchover, to achieve a minimum traffic interruption time during the switchover. As stated in the above description of FIG. 5, the basic idea is to estimate the second end-to-end delay 520 on the inactive path 125 according to the various delays on the active path 115 and the measurable delays on the inactive path 125.

In the example of FIG. 7, the first device 110 and the second device 120 may estimate the second end-to-end delay 520 of the inactive path 125 through the following operations. First of all, the first device 110 and the second device 210 may activate the measuring points 712 and 722, the measuring points 714 and 724 and the measuring points 716 and 726. In some embodiments, the measuring points 712 and 722 may be located at the Ethernet MAC layer of the difference between the data switching delay 731 and the data switching delay 741, or the difference between the data switching delay 739 and the data switching delay 749 is 0.5 microsecond. It should be noted that 'n.a.' means 'not available' since the current path is active, so it can use an actual delay value.

TABLE 1

|  | Before Switchover | | After Switchover | |
| --- | --- | --- | --- | --- |
|  | Example 1 | Example 2 | Example 3 | Example 4 |
| Actual data switching delay 731 and data switching delay 739 | 5 μs | 5 μs | 5 μs | 5 μs |
| Actual data switching delay 741 and data switching delay 749 | 4.5 μs | 5.5 μs | 4.5 μs | 5.5 μs |
| Estimated data switching delay 731 and data switching delay 739 | n.a. | n.a. | 4.5 μs | 5.5 μs |
| Estimated data switching delay 741 and data switching delay 749 | 5 μs | 5 μs | n.a. | n.a. |
| Minimum presentation time offset = Network end-to-end delay 510/520 + Actual data switching delay 731/741 + Actual data switching delay 739/749 | Network end-to-end delay 520 + 4.5 μs *2 | Network end-to-end delay 520 + 5.5 μs *2 | Network end-to-end delay 510 + 5 μs *2 | Network end-to-end delay 510 + 5 μs *2 |
| Estimated presentation time offset = Network end-to-end delay 510/520 + Estimated data switching delay 731/741 + Estimated data switching delay 739/749 + 1 μs | Network end-to-end delay 520 + 5 μs *2 + 1 μs | Network end-to-end delay 520 + 5 μs *2 + 1 μs | Network end-to-end delay 510 + 4.5 μs *2 + 1 μs | Network end-to-end delay 510 + 5.5 μs *2 + 1 μs |
| Difference = Estimated presentation time offset − Minimum presentation time offset | 2 μs | 0 μs | 0 μs | 2 μs | between the RoE mapper or de-mapper and the Ethernet switch; the measuring points 714 and 724 may be located at the Ethernet MAC or PHY layer of the Ethernet port for the working path 115; and the measuring points 716 and 726 may be located at the Ethernet MAC or PHY layer of the Ethernet port for the protection path 125.

Then, the first device 110 and the second device 120 may measure the delay from the time the first bit of a packet is sent by the sender to the time the first bit of the packet is received by the receiver via the measuring points 712 and 722, the measuring points 714 and 724 and the measuring points 716 and 726. Subsequently, the first device 110 and the second device 120 may regularly determine (e.g., measure or estimate) and store the following delays: the first data transmission delay 514, the second data transmission delay 524, a data switching delay 731, a data switching delay 739 and the first end-to-end delay 510. The first device 110 then may calculate the second end-to-end delay 520 on the inactive path 125. For example, assuming the working path 115 is active and the protection path is inactive, the second end-to-end delay 520=the second data transmission delay 524+(data switching delay 731+data switching delay 739)=the second data transmission delay 524+(the first end-to-end delay 510−the first data transmission delay 514).

It is demonstrated in Table 1 below that the accuracy of estimation of the second end-to-end delay 520 on the inactive path 125 in accordance with the embodiments of the present disclosure is acceptable. Specifically, if the maximum data buffer time or jitter buffer time allowed by the presentation time offset is 2 microseconds, the allowed range It should be noted that the approach for estimating the second end-to-end delay 520 on the inactive path 125 depicted in FIGS. 5 to 7 is not restricted to estimation of the RoE presentation time offset, and can also be applied to estimation of any other delays compliant with the above preconditions. Besides, to achieve the delay of internal Ethernet MAC function and Ethernet switch function of the communication device with enough accuracy, the solution in accordance with the embodiments of the present disclosure also may perform a runtime test. However, it may also be possible to measure the internal delay offline before any service is activated, with the knowledge of the traffic pattern on working path and protection path beforehand. Therefore, the solution in accordance with the embodiments of the present disclosure may also be extended to include the offline measurement with beforehand information.

Compared to the conventional solution, the method for estimating the second end-to-end delay 520 on the inactive path 125 proposed by the embodiments of the present disclosure at least has following advantages. First of all, the estimating method can estimate the end-to-end delay on the inactive path and further cover the delays of internal Ethernet MAC function and Ethernet switch function of the communication device, which is not covered by the RoE DM in the conventional IEEE P1914.3a. Then, the estimating method may estimate the end-to-end delay on the inactive path in advance. By contrast, the conventional ITU-T Y.1731 DM cannot measure the delay on the inactive path with the "UP" MEP. Additionally, the above method estimates the delay from the time the first bit of the DM packet is transmitted to the time the first bit of the DM packet is received whereas the conventional ITU-T Y.1731 OAM DM measures the delay from the time the first bit of the DM packet is transmitted to the time the last bit of the DM packet is received. Accordingly, the conventional method fails to estimate the delay of the presentation time offset in the RoE applications.

Figure 8:
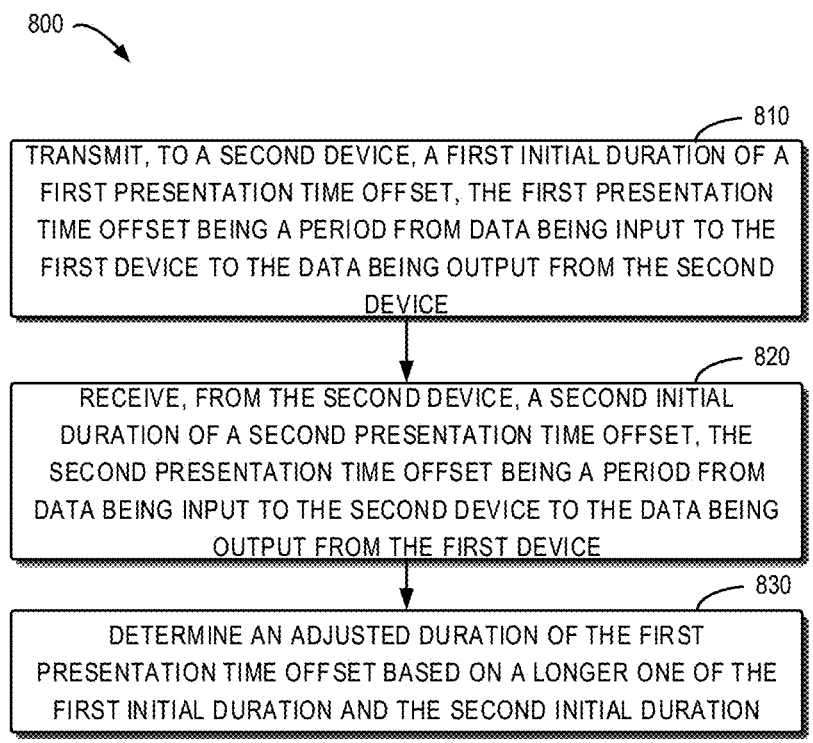
FIG. 8 illustrates a flowchart of an example method for communication in accordance with embodiments of the present disclosure.

FIG. 8 illustrates a flowchart of an example method 800 for communication in accordance with embodiments of the present disclosure. In some embodiments, the example method 800 may be implemented by the first device 100 in the example communication system 100, e.g., processor or processing unit of the first device 110. In other embodiments, the example method 800 also may be implemented by other communication devices in/independent of the example communication system 100. For the purpose of illustration, the example method 800 is described with reference to FIG. 1.

At block 810, the first device 110 transmits, to the second device 120, a first initial duration of a first presentation time offset, where the first presentation time offset is a period from data being input to the first device 110 to the data being output from the second device 120. At block 820, the first device 110 receives, from the second device 120, a second initial duration of a second presentation time offset, where the second presentation time offset is a period from data being input to the second device 120 to the data being output from the first device 110. At block 830, the first device determines an adjusted duration of the first presentation time offset based on a longer one of the first initial duration and the second initial duration.

In some embodiments, the example method 800 also includes: transmitting to the second device 120 the adjusted duration of the first presentation time offset.

In some embodiments, the adjusted duration of the first presentation time offset is a first adjusted duration, and the example method 800 further includes: receiving, from the second device 120, a second adjusted duration of the second presentation time offset, the second adjusted duration is determined based on the longer one of the first initial duration and the second initial duration; and in accordance with a determination that the first adjusted duration is equal to the second adjusted duration, performing data transmission from the first device 110 to the second device 120 based on the first adjusted duration.

In some embodiments, the first presentation time offset and the second presentation time offset are associated with an active path between the first device 110 and the second device 120, and the example method 800 further includes: determining a first end-to-end delay associated with the active path, the first end-to-end delay includes a sum of the following: a first data processing delay associated with the active path within the first device, a first data transmission delay associated with the active path, and a second data processing delay associated with the active path within the second device 120; and determining the first initial duration based on the first end-to-end delay.

In some embodiments, the first presentation time offset and the second presentation time offset are associated with an inactive path between the first device 110 and the second device 120, and the example method 800 further includes: determining a first end-to-end delay associated with an active path between the first device 110 and the second device 120, where the first end-to-end delay includes a sum of the following: a first data processing delay associated with the active path within the first device 110, a first data transmission delay associated with the active path, and a second data processing delay associated with the active path within the second device 120; determining the first data transmission delay; determining a second data transmission delay associated with the inactive path; estimating a second end-to-end delay associated with the inactive path based on the first end-to-end delay, the first data transmission delay and the second data transmission delay, the second end-to-end delay includes a sum of the following: a third data processing delay associated with the inactive path within the first device 110, the second data transmission delay, and a fourth data processing delay associated with the inactive path within the second device 120; and determining the first initial duration based on the second end-to-end delay.

In some embodiments, the active path and the inactive path are Ethernet links, and wherein: the first data transmission delay includes a sum of the following: data transmission delay over a first Ethernet port of the first device 110 connected to the active path, a data transmission delay on the active path, and a data transmission delay over a second Ethernet port of the second device 120 connected to the active path; the first data processing delay includes a data switching delay of a first Ethernet switching component of the first device 110; the second data processing delay includes a data switching delay of a second Ethernet switching component of the second device 120; and the second data transmission delay includes a sum of the following: a data transmission delay over a third Ethernet port of the first device 110 connected to the inactive path, a data transmission delay on the inactive path, and a data transmission delay over a fourth Ethernet port of the second device 120 connected to the inactive path.

In some embodiments, one of the following is determined for a predetermined bit in a packet of data: the first end-to-end delay, the first data transmission delay, the second data transmission delay and the second end-to-end delay.

In some embodiments, a difference between the first data processing delay and the third data processing delay is below a predetermined threshold, and a difference between the second data processing delay and the fourth data processing delay is below a predetermined threshold.

In some embodiments, determining the adjusted duration includes: determining the longer one of the first initial duration and the second initial duration as the adjusted duration.

In some embodiments, transmitting the first initial duration to the second device 120 includes: transmitting the first initial duration via a packet header of a first Radio over Ethernet, RoE, data packet or a first dedicated RoE control packet; and receiving the second initial duration from the second device 120 includes: receiving the second initial duration via a packet header of a second RoE data packet or a second dedicated RoE control packet.

In some embodiments, the first device is a Radio over Ethernet, RoE, switch connected to one of a baseband processing unit and a remote radio unit; and the second device is an RoE switch connected to the other of the baseband processing unit and the remote radio unit.

In some embodiments, an apparatus (e.g., first device 110) capable of performing the example method 800 may include means for performing the corresponding steps of the example method 800. The components may be implemented in any suitable form. For example, the component may be implemented in the circuit or the software module. In another example, the component may include at least one processor and at least one memory, the at least one memory stores computer program codes. The at least one memory and the computer program codes are configured, with the at least one processor, to cause the apparatus to perform the corresponding steps.

In some embodiments, the apparatus includes: means for transmitting, at a first device, to a second device a first initial duration of a first presentation time offset, the first presentation time offset being a period from data being input to the first device to the data being output from the second device. The apparatus also includes: means for receiving, from the second device, a second initial duration of a second presentation time offset, the second presentation time offset being a period from data being input to the second device to the data being output from the first device. The apparatus further includes: means for determining an adjusted duration of the first presentation time offset based on a longer one of the first initial duration and the second initial duration.

In some embodiments, the apparatus also includes: means for transmitting, to the second device, the adjusted duration of the first presentation time offset.

In some embodiments, the adjusted duration of the first presentation time offset is a first adjusted duration, and the apparatus also includes: means for receiving, from the second device, a second adjusted duration of the second presentation time offset, where the second adjusted duration is determined based on the longer one of the first initial duration and the second initial duration; and means for performing data transmission from the first device 110 to the second device 120 based on the first adjusted duration in accordance with a determination that the first adjusted duration is equal to the second adjusted duration.

In some embodiments, the first presentation time offset and the second presentation time offset are associated with an active path between the first device and the second device, and the apparatus further includes: means for determining a first end-to-end delay associated with the active path, where the first end-to-end delay includes a sum of the following: a first data processing delay associated with the active path and a first data transmission delay associated with the active path within the first device, and a second data processing delay associated with the active path within the second device; and means for determining the first initial duration based on the first end-to-end delay.

In some embodiments, the first presentation time offset and the second presentation time offset are associated with an inactive path between the first device and the second device, and the apparatus further includes: means for determining a first end-to-end delay associated with an active path between the first device and the second device, where the first end-to-end delay includes a sum of the following: a first data processing delay associated with the active path within the first device 110, a first data transmission delay associated with the active path, and a second data processing delay associated with the active path within the second device 120; means for determining the first data transmission delay; means for determining a second data transmission delay associated with the inactive path; means for estimating a second end-to-end delay associated with the inactive path based on the first end-to-end delay, the first data transmission delay and the second data transmission delay, wherein the second end-to-end delay includes a sum of the following: a third data processing delay associated with the inactive path within the first device 110, the second data transmission delay, and a fourth data processing delay associated with the inactive path within the second device 120; and means for determining the first initial duration based on the second end-to-end delay.

In some embodiments, the active path and the inactive path are Ethernet links, and wherein: the first data transmission delay includes a sum of the following: a data transmission delay over a first Ethernet port of the first device connected to the active path, a data transmission delay on the active path, and a data transmission delay over a second Ethernet port of the second device connected to the active path; the first data processing delay includes a data switching delay of a first Ethernet switching component of the first device; the second data processing delay includes a data switching delay of a second Ethernet switching component of the second device; and the second data transmission delay includes a sum of the following: data transmission delay over a third Ethernet port of the first device connected to the inactive path, data transmission delay on the inactive path, and data transmission delay over a fourth Ethernet port of the second device connected to the inactive path.

In some embodiments, one of the following is determined for a predetermined bit in a packet of data: the first end-to-end delay, the first data transmission delay, the second data transmission delay and the second end-to-end delay.

In some embodiments, a difference between the first data processing delay and the third data processing delay is below a predetermined threshold, and a difference between the second data processing delay and the fourth data processing delay is below the predetermined threshold.

In some embodiments, means for determining the adjusted duration includes: means for determining the longer one of the first initial duration and the second initial duration as the adjusted duration.

In some embodiments, means for transmitting the first initial duration to the second device includes: means for transmitting the first initial duration via a packet header of a first Radio over Ethernet RoE data packet or a first dedicated RoE control packet; and means for receiving the second initial duration from the second device includes: means for receiving the second initial duration via a packet header of a second RoE data packet or a second dedicated RoE control packet.

In some embodiments, the first device is a Radio over Ethernet, RoE, switch connected to one of a baseband processing unit and a remote radio unit; and the second device is an RoE switch connected to the other of the baseband processing unit and the remote radio unit.

Figure 9:
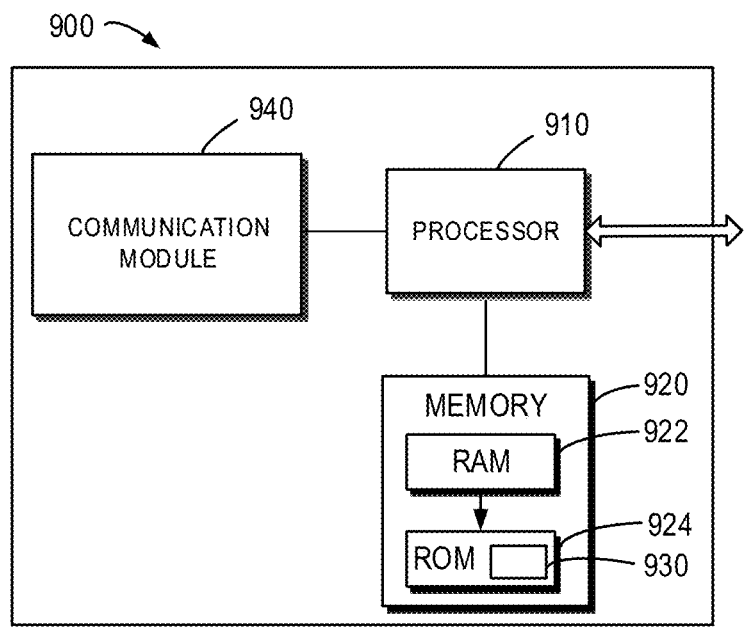
FIG. 9 illustrates a simplified block diagram of an example device suitable for implementing embodiments of the present disclosure.

FIG. 9 illustrates a simplified block diagram of an example device 900 suitable for implementing the embodiments of the present disclosure. The Example device 900 may be used for implementing communication, such as the first device 110, the second device 120, the third device 130 and the fourth device 140 in FIG. 1. As illustrated, the example device 900 includes one or more processors 910, one or more memories 920 coupled to the processor 910, and one or more communication modules 940 coupled to the processor 910.

The communication module 940 is provided for two-way communication and has at least one cable/optical cable/wireless interface to promote communication. The communication interface may represent any interfaces necessary for communication with other devices.

The processor 910 may be of any types suitable for the local technology environment. The non-restrictive examples of the processor 910 may include one or more of: a general-purpose computer, dedicated computer, microprocessor, Digital Signal Processor (DSP) and processor based on multi-core processor architecture. The example device 900 may include a plurality of processors, such as a dedicated integrated circuit chip temporally driven by a clock in synchronization with a main processor.

The memory 920 may include one or more non-volatile memories or one or more volatile memories. Examples of the non-volatile memory include, but are not limited to, Read-Only Memory (ROM) 924, Electrically Programmable Read-Only-Memory (EPROM), flash memory, hard disk, Compact Disk (CD), Digital Versatile Disc (DVD) and other magnetic storage devices and/or optical storage devices. Examples of the volatile memory include, but are not limited to, Random Access Memory (RAM) 922 or other volatile memories that are not persistent in power failure.

The computer program 930 includes computer-executable instructions, which are executed by the associated processor 910. The program 930 may be stored in the ROM 924. The processor 910 may execute various suitable acts and processing by loading the program 930 to the RAM 922.

Embodiments of the present disclosure may be implemented via the program 930, causing the example device 900 to perform any of the above process described above with reference to the drawings. Embodiments of the present disclosure may also be implemented by hardware in combinations with hardware or software.

In some embodiments, the program 930 may be tangibly included in the computer-readable medium, which computer-readable medium may be included in the example device 900 (such as memory 920) or other storage devices accessible by the example device 900. The example device 900 may read the program 930 from the computer-readable medium to the RAM 922 for execution. The computer-readable medium may include a variety of tangible non-volatile storage devices, such as ROM, EPROM, flash memory, hard disk, CD, DVD and the like.

Figure 10:
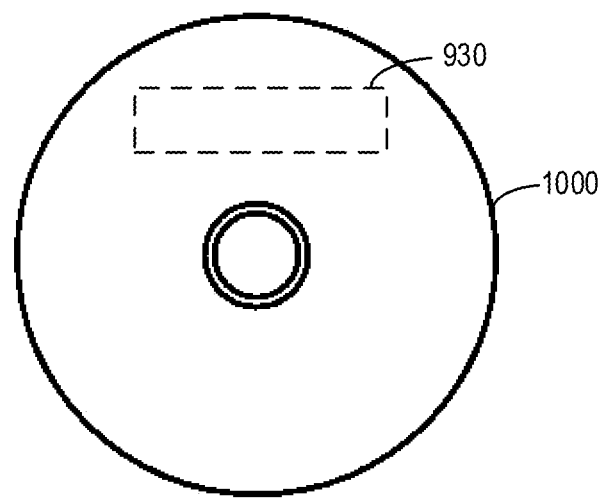
FIG. 10 illustrates a schematic diagram of an example computer-readable medium in accordance with embodiments of the present disclosure.

FIG. 10 illustrates a schematic diagram of an example computer-readable medium 1000 in accordance with embodiments of the present disclosure. As shown in FIG. 10, the computer-readable medium 1000 storing the program 930 may be in the form of CD or DVD or take any other suitable forms.

Generally speaking, various example embodiments of the present disclosure may be implemented in hardware, dedicated circuits, software, logic or any combinations thereof. Some aspects may be implemented in hardware while others may be implemented in firmware or software executed by controllers, microprocessors or other computing devices. For example, in some embodiments, various examples (e.g., a method, apparatus or device) of the present disclosure may be partially or fully implemented on the computer-readable medium. When each aspect of embodiments of the present disclosure is illustrated or described as block diagram or flowchart or represented by some other figures, it should be understood that the block, apparatus, system, technology or method described herein may be implemented in hardware, software, firmware, dedicated circuits, logic, general-purpose hardware, controller, or other computing devices, or any other combinations thereof as non-restrictive examples.

The present disclosure also provides at least one computer program product stored on the non-transitory computer-readable storage medium. The computer program product includes computer-executable instructions, which for example are included in program modules executed in devices on a target physical or virtual processor to perform any of the above procedures described with reference to the drawings. In general, program modules include routines, programs, libraries, objects, classes, components, data architecture and the like, and execute particular tasks or implement particular abstract data structures. In each embodiment, functions of the program module may be merged or divided between the described program modules and the machine-executable instructions for program modules may be executed in local or distributed devices. In the distributed devices, program modules may be positioned either in local or remote storage media.

The program codes for implementing the method of the present disclosure may be written in one of more kinds of programming languages. The computer program codes may be provided to processors of the general-purpose computer, dedicated computer or other programmable data processing apparatuses, such that the program codes, when executed by the computer or other programmable data processing apparatuses, cause the implementation of functions/operations specified in the flowchart and/or block diagram. The program codes can be executed entirely on the computer, partially on the computer, as an independent software package, partially on the computer and partially on the remote computer or entirely on the remote computer or server.

In the context of the present disclosure, the computer program codes or related data may be carried by any suitable carrier, such that the device, apparatus or processor can perform the above described various process and operations. Examples of the carrier include a signal, computer-readable medium and the like.

The computer-executable medium may be a computer-readable signal medium or a computer-readable storage medium. The computer-readable medium may include, but is not limited to, an electronic, magnetic, optical, electro-magnetic, infrared semiconductor system, apparatus or device, or any suitable combinations thereof. The more specific examples of the machine-readable storage medium include an electrical connection including one or more wires, a portable computer disk, a hard disk, a random-access memory (RAM), a read-only memory (ROM), an erasable programmable read-only memory (EPROM or flash), an optical fiber, a portable compact disk read-only memory (CD-ROM), an optical storage device, a magnetic storage device, or any suitable combinations thereof.

Furthermore, although the operations are depicted in a particular order, it should be appreciated that the operations are not required to be completed in the particular order or in succession, or not all operations shown in the drawings need to be executed to obtain the expected result. In some cases, multitasking or multiprocessing is also beneficial. Likewise, although the above description comprises some particular implementation details, they should not be interpreted as limiting the scope of the disclosure or claims. On the contrary, they should be appreciated as description for particular embodiments of the particular disclosure. Some features described separately in the context of the embodiments of the description also can be integrated and implemented in a single embodiment. Conversely, all kinds of features described in the context of a single embodiment also can be separately implemented in multiple embodiments or any suitable sub-combinations.

Although the subject matter has been described in languages specific to structural features and/or method actions, it should be understood that the subject matter defined in the attached claims is not limited to the above described particular features or actions. On the contrary, the above described specific features and actions are disclosed for implementing examples of the claims.

I claim:

1. A method for communication, comprising:
 transmitting, at a first device to a second device, a first initial duration of a first presentation time offset, the first presentation time offset being a period from data being input to the first device to the data being output from the second device;

receiving, from the second device, a second initial duration of a second presentation time offset, the second presentation time offset being a period from data being input to the second device to the data being output from the first device;

determining which of the first initial duration and the second initial duration is longer; and determining an adjusted duration of the first presentation time offset based on the determination of which of the first initial duration and the second initial duration is longer;

wherein the first presentation time offset and the second presentation time offset comprise an end-to-end delay between the first device and the second device and a data buffering time.

2. The method of claim 1, further comprising:

transmitting, to the second device, the adjusted duration of the first presentation time offset.

3. The method of claim 1, wherein the adjusted duration of the first presentation time offset is a first adjusted duration, and the method further comprises:

receiving, from the second device, a second adjusted duration of the second presentation time offset, the second adjusted duration being determined based on the longer one of the first initial duration and the second initial duration; and in accordance with a determination that the first adjusted duration is equal to the second adjusted duration, performing data transmission from the first device to the second device based on the first adjusted duration.

4. The method of claim 1, wherein the first presentation time offset and the second presentation time offset are associated with an active path between the first device and the second device, and the method further comprises:

determining a first end-to-end delay associated with the active path, the first end-to-end delay comprising a sum of the following: a first data processing delay associated with the active path within the first device, a first data transmission delay associated with the active path, and a second data processing delay associated with the active path within the second device; and determining the first initial duration based on the first end-to-end delay.

5. The method of claim 1, wherein the first presentation time offset and the second presentation time offset are associated with an inactive path between the first device and the second device, and the method further comprises:

determining a first end-to-end delay associated with an active path between the first device and the second device, the first end-to-end delay comprising a sum of the following: a first data processing delay associated with the active path within the first device, a first data transmission delay associated with the active path, and a second data processing delay associated with the active path within the second device;

determining the first data transmission delay;

determining a second data transmission delay associated with the inactive path;

estimating a second end-to-end delay associated with the inactive path based on the first end-to-end delay, the first data transmission delay and the second data transmission delay, the second end-to-end delay comprising a sum of the following: a third data processing delay associated with the inactive path within the first device, the second data transmission delay, and a fourth data processing delay associated with the inactive path within the second device; and determining the first initial duration based on the second end-to-end delay.

6. The method of claim 5, wherein the active path and the inactive path are Ethernet links, and wherein:

the first data transmission delay comprises a sum of the following: a data transmission delay over a first Ethernet port of the first device connected to the active path, a data transmission delay on the active path, and a data transmission delay over a second Ethernet port of the second device connected to the active path;

the first data processing delay comprises a data switching delay of a first Ethernet switching component of the first device;

the second data processing delay comprises a data switching delay of a second Ethernet switching component of the second device; and the second data transmission delay comprises a sum of the following: a data transmission delay over a third Ethernet port of the first device connected to the inactive path, a data transmission delay on the inactive path, and a data transmission delay over a fourth Ethernet port of the second device connected to the inactive path.

7. The method of claim 5, wherein one of the following is determined for a particular bit in a packet of data: the first end-to-end delay, the first data transmission delay, the second data transmission delay and the second end-to-end delay.

8. The method of claim 5, wherein a difference between the first data processing delay and the third data processing delay is below a threshold, and a difference between the second data processing delay and the fourth data processing delay is below the threshold.

9. The method of claim 1, wherein the determining the adjusted duration comprises:

determining the longer one of the first initial duration and the second initial duration as the adjusted duration.

10. The method of claim 1, wherein:

transmitting the first initial duration to the second device includes, transmitting the first initial duration via a packet header of a first Radio over Ethernet (RoE) data packet or a first dedicated RoE control packet; and receiving the second initial duration from the second device includes, receiving the second initial duration via a packet header of a second RoE data packet or a second dedicated RoE control packet.

11. The method of claim 1, wherein:

the first device is a first Radio over Ethernet (RoE) switch connected to one of a baseband processing unit and a remote radio unit; and the second device is a second RoE switch connected to the other of the baseband processing unit and the remote radio unit.

12. A non-transitory computer-readable medium storing machine-executable instructions which, when executed by a processor, cause a machine including the processor to perform the method of claim 1.

13. A first device comprising:

at least one processor; and at least one memory storing computer program instructions, the at least one memory and the computer program instructions being configured, with the at least one processor, to cause the first device to, transmit, to a second device, a first initial duration of a first presentation time offset, the first presentation time offset being a period from data being input to the first device to the data being output from the second device;

receive, from the second device, a second initial duration of a second presentation time offset, the second presentation time offset being a period from data being input to the second device to the data being output from the first device;

determining which of the first initial duration and the second initial duration is longer; and determine an adjusted duration of the first presentation time offset based on the determination of which of the first initial duration and the second initial duration is longer, wherein the first presentation time offset and the second presentation time offset comprise an end-to-end delay between the first device and the second device and a data buffering time.

14. The first device of claim 13, wherein the at least one memory and the computer program instructions are further configured, with the at least one processor, to cause the first device to:

transmit, to the second device, the adjusted duration of the first presentation time offset.

15. The first device of claim 13, wherein the adjusted duration of the first presentation time offset is a first adjusted duration, and the at least one memory and the computer program instructions are further configured, with the at least one processor, to cause the first device to:

receive, from the second device, a second adjusted duration of the second presentation time offset, the second adjusted duration being determined based on the longer one of the first initial duration and the second initial duration; and in accordance with a determination that the first adjusted duration is equal to the second adjusted duration, perform data transmission from the first device to the second device based on the first adjusted duration.

16. The first device of claim 13, wherein the first presentation time offset and the second presentation time offset are associated with an active path between the first device and the second device, and the at least one memory and the computer program instructions are further configured, with the at least one processor, to cause the first device to:

determine a first end-to-end delay associated with the active path, the first end-to-end delay comprising a sum of the following: a first data processing delay associated with the active path within the first device, a first data transmission delay associated with the active path, and a second data processing delay associated with the active path within the second device; and determine the first initial duration based on the first end-to-end delay.

17. The first device of claim 13, wherein the first presentation time offset and the second presentation time offset are associated with an inactive path between the first device and the second device, and the at least one memory and the computer program instructions are further configured, with the at least one processor, to cause the first device to:

determine a first end-to-end delay associated with an active path between the first device and the second device, the first end-to-end delay comprising a sum of the following: a first data processing delay associated with the active path within the first device, a first data transmission delay associated with the active path, and a second data processing delay associated with the active path within the second device;

determine the first data transmission delay;

determine a second data transmission delay associated with the inactive path;

estimate a second end-to-end delay associated with the inactive path based on the first end-to-end delay, the first data transmission delay and the second data transmission delay, the second end-to-end delay comprising a sum of the following: a third data processing delay associated with the inactive path within the first device, the second data transmission delay, and a fourth data processing delay associated with the inactive path within the second device; and determine the first initial duration based on the second end-to-end delay.

18. The first device of claim 17, wherein the active path and the inactive path are Ethernet links, and wherein:

the first data transmission delay comprises a sum of the following: a data transmission delay over a first Ethernet port of the first device connected to the active path, a data transmission delay on the active path, and a data transmission delay over a second Ethernet port of the second device connected to the active path;

the first data processing delay comprises a data switching delay of a first Ethernet switching component of the first device;

the second data processing delay comprises a data switching delay of a second Ethernet switching component of the second device; and the second data transmission delay comprises a sum of the following: a data transmission delay over a third Ethernet port of the first device connected to the inactive path, a data transmission delay on the inactive path, and a data transmission delay over a fourth Ethernet port of the second device connected to the inactive path.

19. The first device of claim 17, wherein one of the following is determined for a particular bit in a packet of data: the first end-to-end delay, the first data transmission delay, the second data transmission delay and the second end-to-end delay.

20. The first device of claim 17, wherein a difference between the first data processing delay and the third data processing delay is below a threshold, and a difference between the second data processing delay and the fourth data processing delay is below the threshold.

21. The first device of claim 13, wherein the at least one memory and the computer program instructions are further configured, with the at least one processor, to cause the first device to determine the adjusted duration by:

determining the longer one of the first initial duration and the second initial duration as the adjusted duration.

22. The first device of claim 13, wherein:

the at least one memory and the computer program instructions are further configured, with the at least one processor, to cause the first device to transmit the first initial duration to the second device by, transmitting the first initial duration via a packet header of a first Radio over Ethernet (RoE) data packet or a first dedicated RoE control packet; and the at least one memory and the computer program instructions are further configured, with the at least one processor, to cause the first device to receive the second initial duration from the second device by, receiving the second initial duration via a packet header of a second RoE data packet or a second dedicated RoE control packet.

23. The first device of claim 13, wherein:
the first device is a first Radio over Ethernet (RoE) switch connected to one of a baseband processing unit and a remote radio unit; and
the second device is a second RoE switch connected to the other of the baseband processing unit and the remote radio unit.

24. An apparatus for communication, comprising:
means for transmitting, at a first device to a second device, a first initial duration of a first presentation time offset, the first presentation time offset being a period from data being input to the first device to the data being output from the second device;
means for receiving, from the second device, a second initial duration of a second presentation time offset, the second presentation time offset being a period from data being input to the second device to the data being output from the first device;
means for determining which of the first initial duration and the second initial duration is longer; and
means for determining an adjusted duration of the first presentation time offset based on the determination of which of the first initial duration and the second initial duration is longer,
wherein the first presentation time offset and the second presentation time offset comprise an end-to-end delay between the first device and the second device and a data buffering time.

* * * * *